United States Patent
Ma

(10) Patent No.: US 12,520,057 B2
(45) Date of Patent: Jan. 6, 2026

(54) IMAGING ELEMENT AND ELECTRONIC DEVICE

(71) Applicant: SONY SEMICONDUCTOR SOLUTIONS CORPORATION, Kanagawa (JP)

(72) Inventor: Bo Ma, Kanagawa (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 112 days.

(21) Appl. No.: 18/686,894

(22) PCT Filed: Sep. 14, 2021

(86) PCT No.: PCT/JP2021/033683
§ 371 (c)(1),
(2) Date: Feb. 27, 2024

(87) PCT Pub. No.: WO2023/042246
PCT Pub. Date: Mar. 23, 2023

(65) Prior Publication Data
US 2024/0357250 A1    Oct. 24, 2024

(51) Int. Cl.
*H04N 25/532* (2023.01)
*H04N 25/59* (2023.01)
(Continued)

(52) U.S. Cl.
CPC ........... *H04N 25/532* (2023.01); *H04N 25/59* (2023.01); *H04N 25/77* (2023.01); *H04N 25/78* (2023.01)

(58) Field of Classification Search
CPC ...... H04N 25/532; H04N 25/59; H04N 25/77; H04N 25/78; H04N 25/70; H04N 25/76; H04N 25/771
See application file for complete search history.

(56) References Cited

U.S. PATENT DOCUMENTS

| 2005/0225655 | A1* | 10/2005 | Suzuki | H04N 25/17 348/272.3 |
| 2012/0075509 | A1* | 3/2012 | Ito | H10F 39/8057 348/265 |

(Continued)

FOREIGN PATENT DOCUMENTS

| JP | 2005-286104 A | 10/2005 |
| JP | 2010-130254 A | 6/2010 |
| JP | 2012-074521 A | 4/2012 |

OTHER PUBLICATIONS

International Search Report and Written Opinion of PCT Application No. PCT/JP2021/033683, issued on Nov. 22, 2021, 08 pages of ISRWO.

*Primary Examiner* — Marly S Camargo
(74) *Attorney, Agent, or Firm* — CHIP LAW GROUP

(57) ABSTRACT

An imaging element according to an embodiment includes: a pixel region in which pixels, each including a photoelectric conversion unit and a first capacitor that accumulates a charge based on photoelectric conversion by the photoelectric conversion unit, are arranged in a two-dimensional matrix, the pixel region having a first pixel group constituted by pixels arranged adjacent to each other in a diagonal direction and a second pixel group constituted by pixels adjacent above, below, to the right, and to the left of the pixels in the first pixel group; and a drive unit that generates drive signals that drive the pixels in the pixel region. In a first period of signal readout based on charges accumulated in the first capacitors in the pixel region, the drive unit maintains a reset state that suppresses charge accumulation in the first capacitors of the second pixel group.

20 Claims, 19 Drawing Sheets

(51) Int. Cl.
*H04N 25/76* (2023.01)
*H04N 25/77* (2023.01)
*H04N 25/771* (2023.01)
*H04N 25/78* (2023.01)

(56) References Cited

U.S. PATENT DOCUMENTS

2019/0253657 A1* 8/2019 Kobayashi ............ H10F 39/809
2025/0211873 A1* 6/2025 Aumiller ................ H04N 25/78

* cited by examiner

IMAGE DATA OF FIRST PIXEL GROUP      IMAGE DATA OF SECOND PIXEL GROUP

IMAGING ELEMENT AND ELECTRONIC DEVICE

CROSS REFERENCE TO RELATED APPLICATIONS

This application is a U.S. National Phase of International Patent Application No. PCT/JP2021/033683 filed on Sep. 14, 2021. Each of the above-referenced applications is hereby incorporated herein by reference in its entirety.

TECHNICAL FIELD

The present disclosure relates to an imaging element and an electronic device.

BACKGROUND ART

Current photoelectric conversion elements using InGaAs can capture images up to the near-infrared (NIR) and short-wave infrared (SWIR) ranges. Such elements are therefore used in industrial inspection devices as well as general photography.

CITATION LIST

Patent Literature

PTL 1
JP 2005-286104A

SUMMARY

Technical Problem

If separation at the pixel level in the photoelectric conversion layer is not possible, there is a risk that the resulting carriers will move to adjacent pixels and produce mixed colors.

Accordingly, the present disclosure provides an imaging element and an electronic device capable of better suppressing color mixing.

Solution to Problem

To solve the above-described problem, the present disclosure provides an imaging element including: a pixel region in which pixels, each including a photoelectric conversion unit and a first capacitor that accumulates a charge based on photoelectric conversion by the photoelectric conversion unit, are arranged in a two-dimensional matrix, the pixel region having a first pixel group constituted by pixels arranged adjacent to each other in a diagonal direction and a second pixel group constituted by pixels adjacent above, below, to the right, and to the left of the pixels in the first pixel group; and a drive unit that generates drive signals that drive the pixels in the pixel region, wherein in a first period of signal readout based on charges accumulated in the first capacitors in the pixel region, the drive unit maintains a reset state that suppresses charge accumulation in the first capacitors of the second pixel group.

In a second period different from the first period of signal readout based on charges accumulated in the first capacitors in the pixel region, the drive unit may maintain a reset state that suppresses charge accumulation in the first capacitors of the first pixel group.

A signal of the first pixel group read out in the first period may be corrected using a signal of the first pixel group read out in the second period.

A signal of the second pixel group read out in the first period may be corrected using a signal of the second pixel group read out in the second period.

The photoelectric conversion unit may be a photoelectric conversion element using InGaAs.

In a first exposure period in which the pixels of the first pixel group are exposed, the drive unit may maintain a reset state that suppresses charge accumulation in response to the exposure of the pixels in the second pixel group.

In a second exposure period that follows the first exposure period, the drive unit may cause the pixels of the second pixel group to be exposed and maintain a reset state that suppresses charge accumulation in the pixels of the first pixel group.

The first exposure period and the second exposure period may have different lengths.

The pixels of the first pixel group may be exposed via a polarizing element that polarizes in a first direction, and the pixels in the second pixel group may be exposed via a polarizing element that polarizes in a second direction different from the first direction.

The pixel may include at least: the photoelectric conversion unit; a second capacitor that accumulates a charge generated by the photoelectric conversion unit; a transfer transistor that transfers the charge accumulated in the second capacitor to the first capacitor; the first capacitor; and an amplifying transistor that amplifies the first capacitor and outputs a signal at a level according to the charge.

The transfer transistor of each of the pixels of the first pixel group disposed in the same row of the pixel region may be connected to the drive unit by a first control line, and the transfer transistor of each of the pixels in the second pixel group disposed in the same row of the pixel region may be connected to the drive unit by a second control line different from the first control line.

The pixel may further include: a second reset transistor that puts the second capacitor in a reset state; and a first reset transistor that puts the first capacitor in a reset state.

The second reset transistor of each of the pixels of the first pixel group disposed in the same row of the pixel region may be connected to the drive unit by a third control line, and the second reset transistor of each of the pixels in the second pixel group disposed in the same row of the pixel region may be connected to the drive unit by a fourth control line different from the third control line.

The drive unit may perform the signal readout in the first period while keeping the transfer transistors in the second pixel group in a non-conductive state and after putting the first capacitors into a reset state using the first reset transistors.

The drive unit may perform the signal readout in the second period while keeping the transfer transistors in the first pixel group in a non-conductive state and after putting the first capacitors into a reset state using the first reset transistors.

In the first exposure period, the drive unit may maintain a state in which the second reset transistors in the second pixel group are in a conductive state.

In the second exposure period, the drive unit may maintain a state in which the second reset transistors in the first pixel group are in a conductive state.

An electronic device may be provided that includes the imaging element.

An electronic device including an imaging element may further include: an image processing unit that interpolates and composites first image data based on the first exposure period and second image data based on the second exposure period.

DESCRIPTION OF EMBODIMENTS

Embodiments of a photoelectric conversion element, a manufacturing method thereof, and an image capturing device will be described hereinafter with reference to the drawings. Although the following descriptions will focus on the photoelectric conversion element, the manufacturing method thereof, and the main constituent elements of the image capturing device, the photoelectric conversion element, the manufacturing method thereof, and the image capturing device may include constituent elements, functions, and the like that are not illustrated or described. The following descriptions are not intended to exclude constituent elements or functions that are not illustrated or described.

First Embodiment

Figure 1:
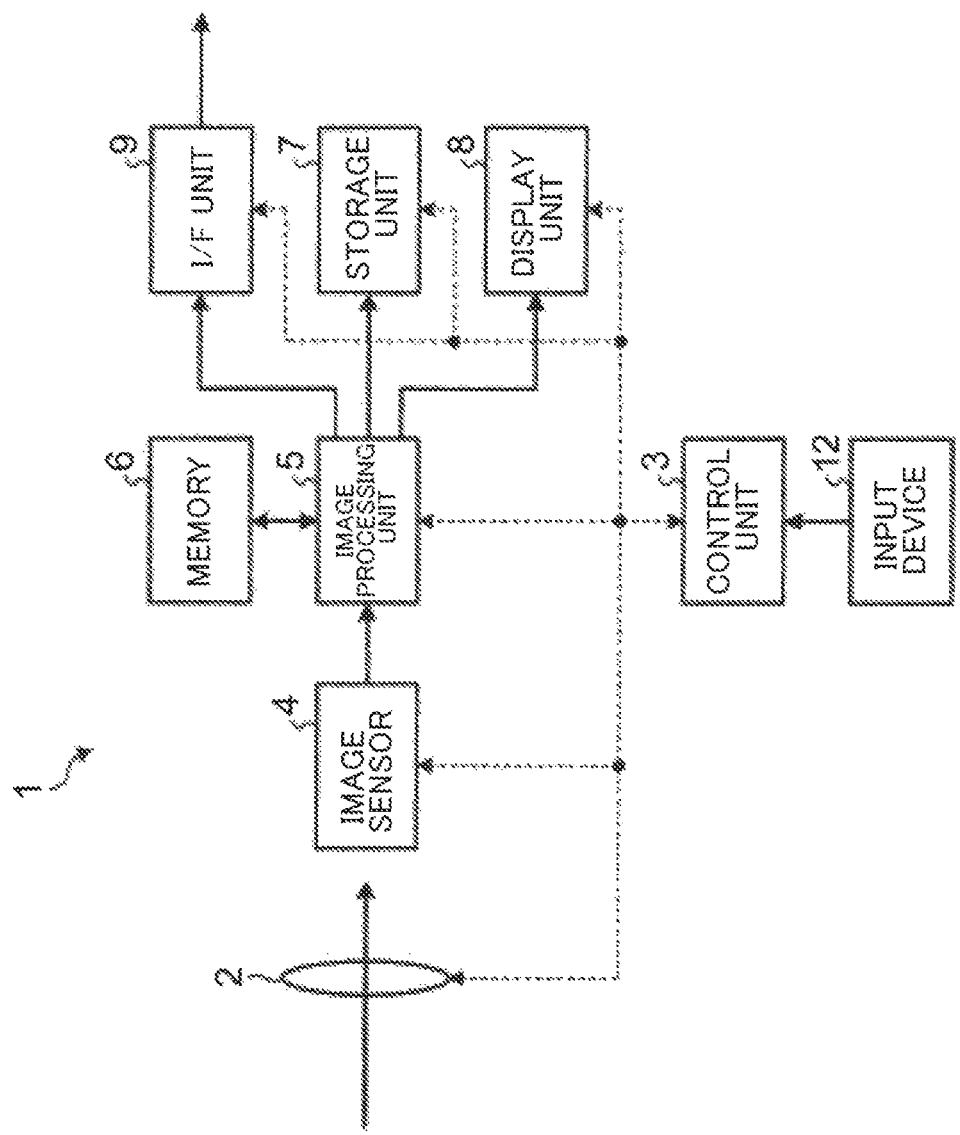
FIG. 1 is a diagram illustrating the configuration of an electronic device 1 according to an embodiment.

FIG. 1 is a diagram illustrating an example of the configuration of an electronic device 1 according to the present embodiment. As illustrated in FIG. 1, the electronic device 1 is an electronic device capable of capturing images up to the near-infrared (NIR) and short-wave infrared (SWIR) ranges, for example. The electronic device 1 includes, for example, an optical system 2, a control unit 3, an imaging element 4, an image processing unit 5, a memory 6, a storage unit 7, a display unit 8, an interface (I/F) unit 9, and an input device 12.

Here, a digital still camera, a digital video camera, a mobile phone having an image capturing function, a smartphone, or the like can be applied as the electronic device 1. A surveillance camera, an in-vehicle camera, a medical camera, or the like can also be applied as the electronic device 1.

The imaging element 4 includes a plurality of photoelectric conversion elements disposed in a matrix-type array, for example. The imaging element 4 is configured to independently control the image capturing timings of a first pixel group and a second pixel group. The configuration of the imaging element 4 will be described in detail later.

The optical system 2 includes a main lens that is a single lens or a combination of a plurality of lenses as well as a mechanism for driving the main lens, and forms image light (incident light) from a subject into an image on a light-receiving surface of the imaging element 4 through the main lens. The optical system 2 also includes an autofocus mechanism that adjusts the focus in accordance with control signals, and a zoom mechanism that changes a zoom rate in accordance with control signals. The electronic device 1 may make also be configured such that the optical system 2 is removable and can be interchanged with another optical system 2.

The image processing unit 5 executes predetermined image processing on image data output from the imaging element 4. For example, the image processing unit 5 is connected to the memory 6, which is implemented as a frame memory or the like, and writes the image data output from the imaging element 4 into the memory 6. The image processing unit 5 executes predetermined image processing on the image data written into the memory 6, and writes the image data which has undergone the image processing into the memory 6 again.

The storage unit 7 is a non-volatile memory, such as a flash memory or a hard disk drive, and stores the image data output from the image processing unit 5 in a non-volatile manner. The display unit 8 includes a display device, such as a liquid crystal display (LCD), and a drive circuit that drives the display device, and can display an image based on the image data output by the image processing unit 5. The I/F unit 9 is an interface for transmitting the image data output from the image processing unit 5 to the exterior. Universal Serial Bus (USB) can be applied as the I/F unit 9, for example. The I/F unit 9 is not limited thereto, and may be an interface that can be connected to a network through wired or wireless communication.

The input device 12 includes operators for accepting user inputs and the like. If the electronic device 1 is, for example, a digital still camera, a digital video camera, a mobile phone having an image capturing function, a smartphone, or the like, the input device 12 can include a shutter button for instructing the imaging element 4 to capture an image, or an operator for implementing the function of a shutter button.

The control unit 3 includes a processor such as a Central Processing Unit (CPU), a Read Only Memory (ROM), and a Random Access Memory (RAM), and controls the overall operations of the electronic device 1, using the RAM as a work memory, in accordance with programs stored in advance in the ROM. For example, the control unit 3 can control the operations of the electronic device 1 in response to user inputs accepted through the input device 12. The control unit 3 can control the autofocus mechanism in the optical system 2 based on the result of the image processing by the image processing unit 5.

Figure 2:
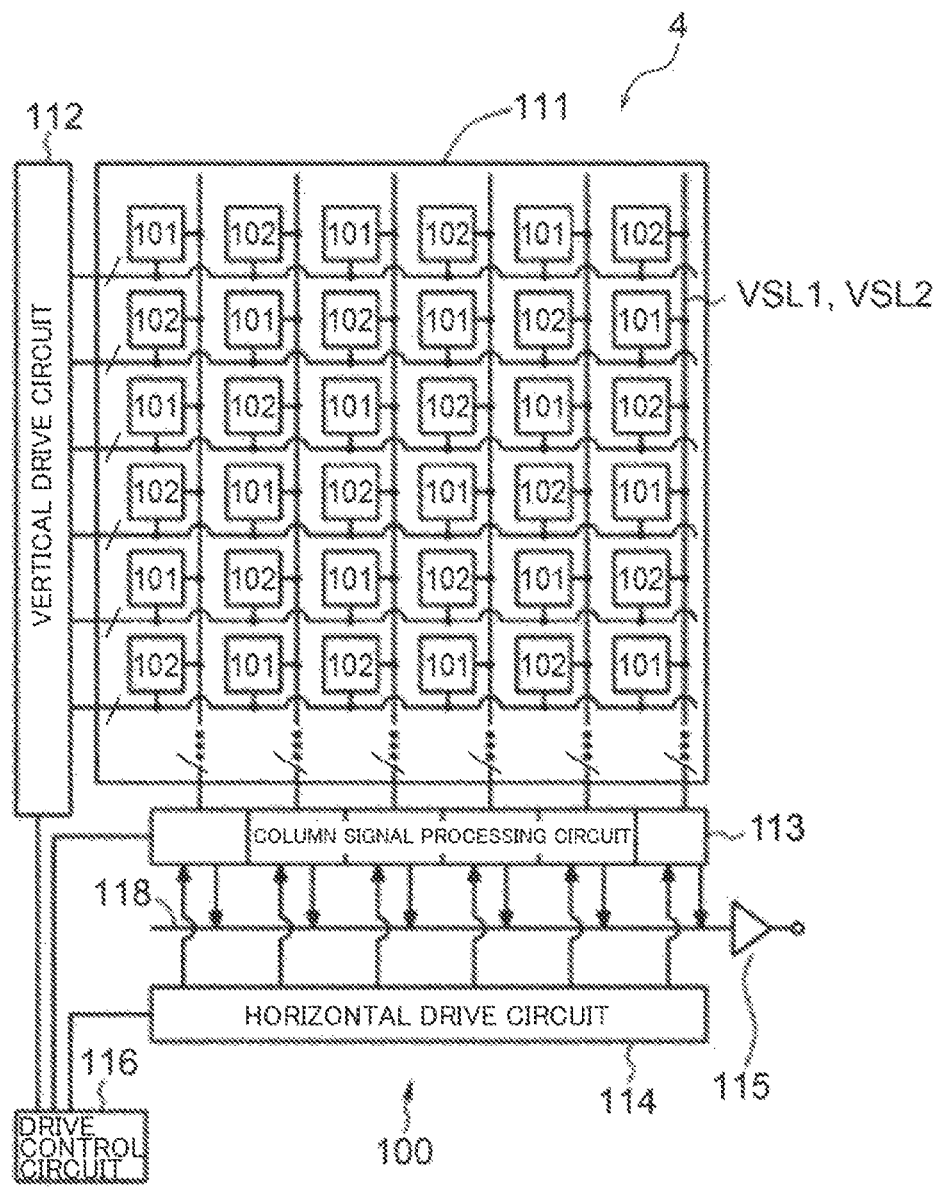
FIG. 2 is a diagram illustrating an example of the configuration of an imaging element according to an embodiment.

FIG. 2 is a diagram illustrating an example of the configuration of the imaging element 4 according to the present embodiment. As illustrated in FIG. 2, the imaging element 4 is configured including a pixel region 111 in which pixels 101 and 102 are arranged in a two-dimensional matrix (two-dimensional array), a vertical drive circuit 112 serving as a drive circuit (peripheral circuitry) thereof, a column signal processing circuit 113, a horizontal drive circuit 114, an output circuit 115, a drive control circuit 116, and the like.

The first pixel group is constituted by a plurality of the pixels 101, and the second photoelectric conversion element group is constituted by a plurality of the pixels 102. The pixels 101 that are adjacent in the diagonal direction are disposed in the first pixel group. The pixels 102 that are adjacent to the pixels 101 in the upper, lower, left, and right directions are disposed in the second pixel group. In other words, the pixels 102 in the second pixel group are disposed in diagonal directions, and the pixels 101 in the first pixel group and the pixels 102 in the second pixel group are disposed in a checkerboard pattern. To simplify the descriptions, 101 is appended to each pixel in the first pixel group and 102 is appended to each pixel in the second pixel group, but the configuration is not limited thereto. The drive control according to the present embodiment can be performed in the same manner even if, for example, the pixels 102 are in the first pixel group and the pixels 101 are in the second pixel group.

The drive control circuit 116 generates clock signals and control signals as references for operations of the vertical drive circuit 112, the column signal processing circuit 113, and the horizontal drive circuit 114 based on vertical synchronization signals, horizontal synchronization signals, and a master clock. Then, the generated clock signals and control signals are input to the vertical drive circuit 112, the column signal processing circuit 113, and the horizontal drive circuit 114. The vertical drive circuit 112 and the drive control circuit 116 according to the present embodiment correspond to a drive unit. Although the drive unit according to the present embodiment is constituted by the vertical drive circuit 112 and the drive control circuit 116, the configuration is not limited thereto. For example, the drive unit may be a circuit or an element capable of controlling the driving of each pixel in the pixel region 111.

The vertical drive circuit 112 is constituted by a shift register, for example, and the pixels 101 and 102 in the pixel region 111 can be sequentially selected and scanned in the vertical direction in units of rows. The vertical drive circuit 112 can also be driven using a global shutter method in which the image capturing timings of the first pixel group and the second pixel group are individually controlled when capturing an image. Pixel signals (image signals) based on the signals (current or voltage) generated in accordance with the amount of light received by the pixels 101 and 102 are then sent to the column signal processing circuit 113 via the signal lines (data output lines) VLS1 and VLS2.

The column signal processing circuit 113 is disposed, for example, for each column of the pixels 101 and 102, and performs signal processing for noise removal, signal amplification, and the like on image signals output from one row's worth of photoelectric conversion elements PD using signals from black reference pixels (not shown, but formed in the periphery of an effective pixel region) for each imaging element. A horizontal selection switch (not shown) is connected between a horizontal signal line 118 and the output stage of the column signal processing circuit 113. In other words, in the present embodiment, a VSL1 line is disposed for each column of the pixels 101, and a VSL2 line is disposed for each column of the pixels 102. Through this, for the pixels 101 and the pixels 102 in the same column, the image signals output from one row's worth of photoelectric conversion elements PD can be subjected to signal processing such as noise removal, signal amplification, and the like using signals from the black reference pixels (not shown, but formed in the periphery of the effective pixel region, for example) for each imaging element, at independent timings.

The horizontal drive circuit 114 is constituted by, for example, a shift register, sequentially outputs horizontal scanning pulses and thus sequentially selects each of the column signal processing circuits 113, and outputs signals from each of the column signal processing circuits 113 to the horizontal signal line 118.

The output circuit 115 performs signal processing on signals that are sequentially supplied through the horizontal signal line 118 from each column signal processing circuit 113, and outputs the processed signals.

Figure 3A:
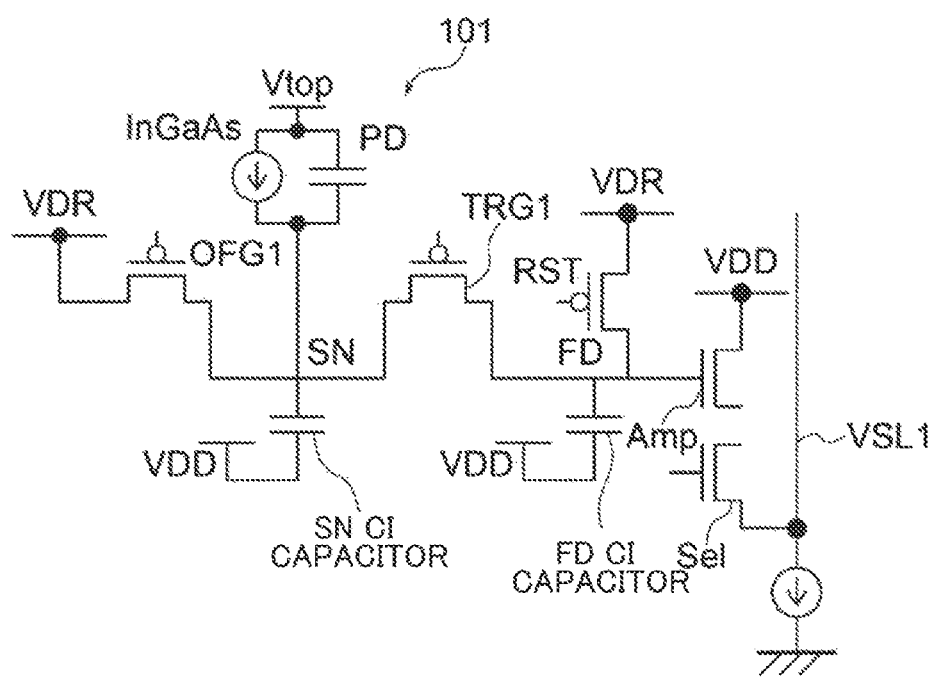
FIG. 3A is a diagram illustrating an example of the configuration of a first pixel.
Figure 3B:
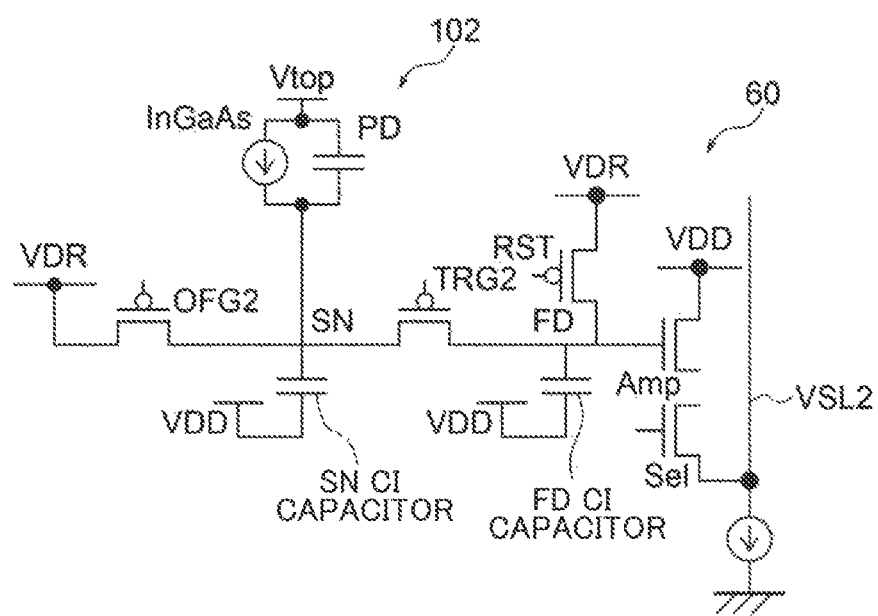
FIG. 3B is a diagram illustrating an example of the configuration of a second pixel.
Figure 4:
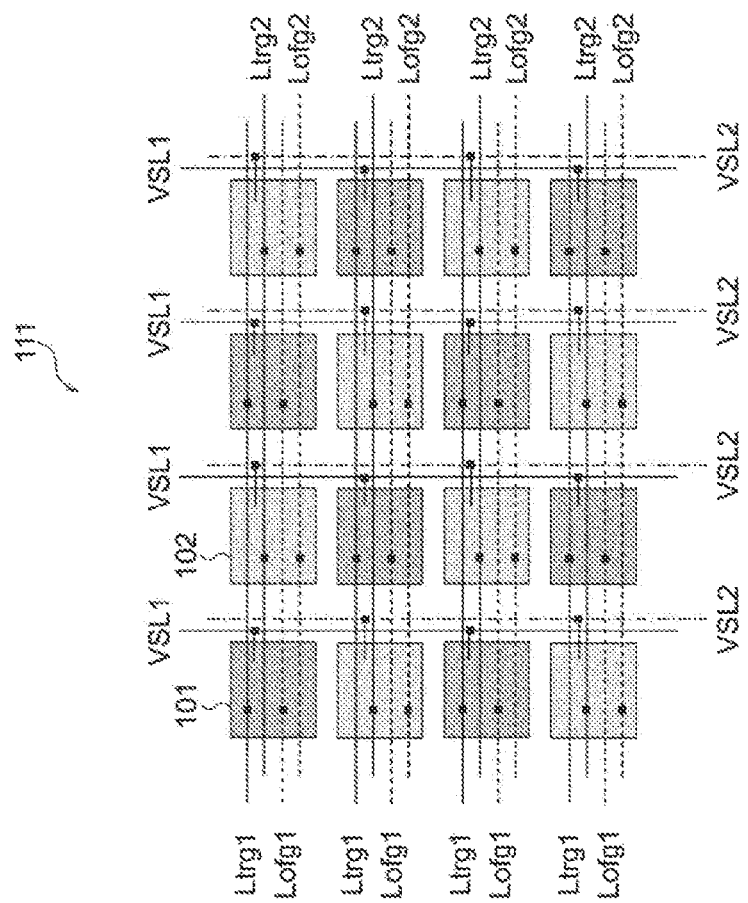
FIG. 4 is a diagram illustrating an example of wiring for transistors that can be individually controlled between a first pixel group and a second pixel group.

An example of the configurations of the pixels 101 and 102 will be described with reference to FIGS. 3A, 3B, and 4. FIG. 3A is a diagram illustrating an example of the configuration of the pixel 101. FIG. 3B is a diagram illustrating an example of the configuration of the pixel 102. FIG. 4 is a diagram illustrating an example of wiring for transistors that can be individually controlled between the first pixel group and the second pixel group.

As illustrated in FIG. 3A, the pixel 101 includes a photoelectric conversion element PD formed from InGaAs (n-InGaAs, e.g., n-In0.57Ga0.43As). The pixel 101 is constituted by, for example, a Complementary Metal Oxide Semiconductor (CMOS) circuit, and includes an overflow gate transistor OFG1 (hereinafter referred to simply as a transistor OFG1), a transfer transistor TRG1, a reset transistor RST, which are P-type Metal Oxide Semiconductor (MOS) transistors, an amplifying transistor Amp and a path selection transistor Sel, which are N-type MOS (Metal Oxide Semiconductor) transistors, a SN CI capacitor, and a FD CI capacitor. The photoelectric conversion element PD according to the present embodiment corresponds to a photoelectric conversion unit; the SN CI capacitor corresponds to a second capacitor; transfer transistors TRG1 and TRG2 correspond to transfer transistors; the FD CI capacitor corresponds to a first capacitor; the amplifying transistor Amp corresponds to an amplifying transistor; the overflow gate transistor OFG1 corresponds to a second reset transistor; and the reset transistor RST corresponds to a first reset transistor. Although the SN CI capacitor and the FD CI capacitor are illustrated with capacitor symbols, the SN CI capacitor and the FD CI capacitor may be constituted by floating capacitance or parasitic capacitance instead of capacitors.

In the pixel 101, the cathode of a photodiode PD is connected to a connection point SN, where the source of the overflow gate transistor OFG1 and the source of the transfer transistor TRG1 are connected. The drain of the overflow gate transistor OFG1 is connected to a power supply line of a power supply VDR. The drain of the transfer transistor TRG1 is connected to a connection point FD, where one end of the FD CI capacitor, the source of the reset transistor RST, and the gate of the amplifying transistor Amp are connected. The drain of the reset transistor RST is connected to the power supply line of the power supply VDR.

One end of the SN CI capacitor is connected to the connection point SN, and the other end is connected to a power supply line of a power supply VDD. Likewise, the other end of the FD CI capacitor is connected to the power supply line of a power supply VDD.

The power supply line of the power supply VDD is connected to the drain of the amplifying transistor Amp, and the drain of the path selection transistor Sel is connected to the source. The source of the path selection transistor Sel is connected to a vertical signal line VSL1. The amplifying transistor Amp constitutes what is known as a source follower with a current supply.

A drive signal Strg1, which is a pulse, for example, is supplied to the gate of the transfer transistor TRG1 from the vertical drive circuit 112 over a signal line Ltrg1 (see FIG. 4). Additionally, a drive signal Sofg1, which is a pulse, for example, is supplied to the gate of the transistor OFG1 from the vertical drive circuit 112 over a signal line Lofg1 (see FIG. 4). The transfer transistor TRG1 and the transistor OFG1 are turned on (a conductive state) when the drive signals Strg1 and Sofg1, respectively, are in a high state, and are turned off (a non-conductive state) when the drive signals Strg1 and Sofg1, respectively, are in a low state. Note that in the present embodiment, the conductive state of the transistor is referred to as "on" or an "on state", and the non-conductive state is referred to as "off" or an "off state".

The reset transistor RST turns on when a drive signal Srst from the vertical drive circuit 112 is in a high state, and turns off when the drive signal Srst is in a low state. Likewise, the path selection transistor Sel turns on when a drive signal Ssel from the vertical drive circuit 112 is in a high state, and turns off when the drive signal Ssel is in a low state.

As illustrated in FIG. 3B, the pixel 102 has a configuration equivalent to that of the pixel 101. In order to identify the pixel 101 and the pixel 102, a "1" is appended to elements that can be independently controlled and signals related to the pixel 101, and a "2" is appended to elements that can be independently controlled and signals related to the pixel 102. In other words, the pixel 102 includes a photoelectric conversion element PD formed from InGaAs (n-InGaAs, e.g., n-In0.57Ga0.43As). The pixel 102 is constituted by, for example, a Complementary Metal Oxide Semiconductor (CMOS) circuit, and includes an overflow gate transistor OFG2, a transfer transistor TRG2, a reset transistor RST, which are P-type Metal Oxide Semiconductor (MOS) transistors, an amplifying transistor Amp and a path selection transistor Sel, which are N-type MOS (Metal Oxide Semiconductor) transistors, a SN CI capacitor, and a FD CI capacitor. The source of the path selection transistor Sel is connected to a vertical signal line VSL1. The other connection relationships are the same as in the pixel 101 and will therefore not be described.

A drive signal Strg2, which is a pulse, for example, is supplied to the gate of the transfer transistor TRG2 from the vertical drive circuit 112 over a signal line Ltrg2 (see FIG. 4). Additionally, a drive signal Sofg2, which is a pulse, for example, is supplied to the gate of the transistor OFG2 from the vertical drive circuit 112 over a signal line Lofg2 (see FIG. 4). The transfer transistor TRG2 and the transistor OFG2 turn on when the drive signals Strg2 and Sofg2, respectively, are in a high state, and turn off when the drive signals Strg2 and Sofg2, respectively, are in a low state. The reset transistor RST turns on when a drive signal Srst from the vertical drive circuit 112 is in a high state, and turns off when the drive signal Srst is in a low state. Likewise, the path selection transistor Sel turns on when a drive signal Ssel from the vertical drive circuit 112 is in a high state, and turns off when the drive signal Ssel is in a low state.

As illustrated in FIG. 4, the signal line Ltrg1 is connected from the vertical drive circuit 112 to the gate of the transfer transistor TRG1 of the pixel 101. The signal line Lofg1 is connected from the vertical drive circuit 112 to the gate of the transistor OFG1. On the other hand, the signal line Ltrg2 is connected from the vertical drive circuit 112 to the gate of the transfer transistor TRG2 of the pixel 102. The signal line Lofg2 is connected from the vertical drive circuit 112 to the gate of the transistor OFG2. In this manner, the vertical drive circuit 112 can control the transfer transistor TRG1 and the transistor OFG1, which are arranged in the same row, independently from the transfer transistor TRG2 and the transistor OFG2.

Figure 5:
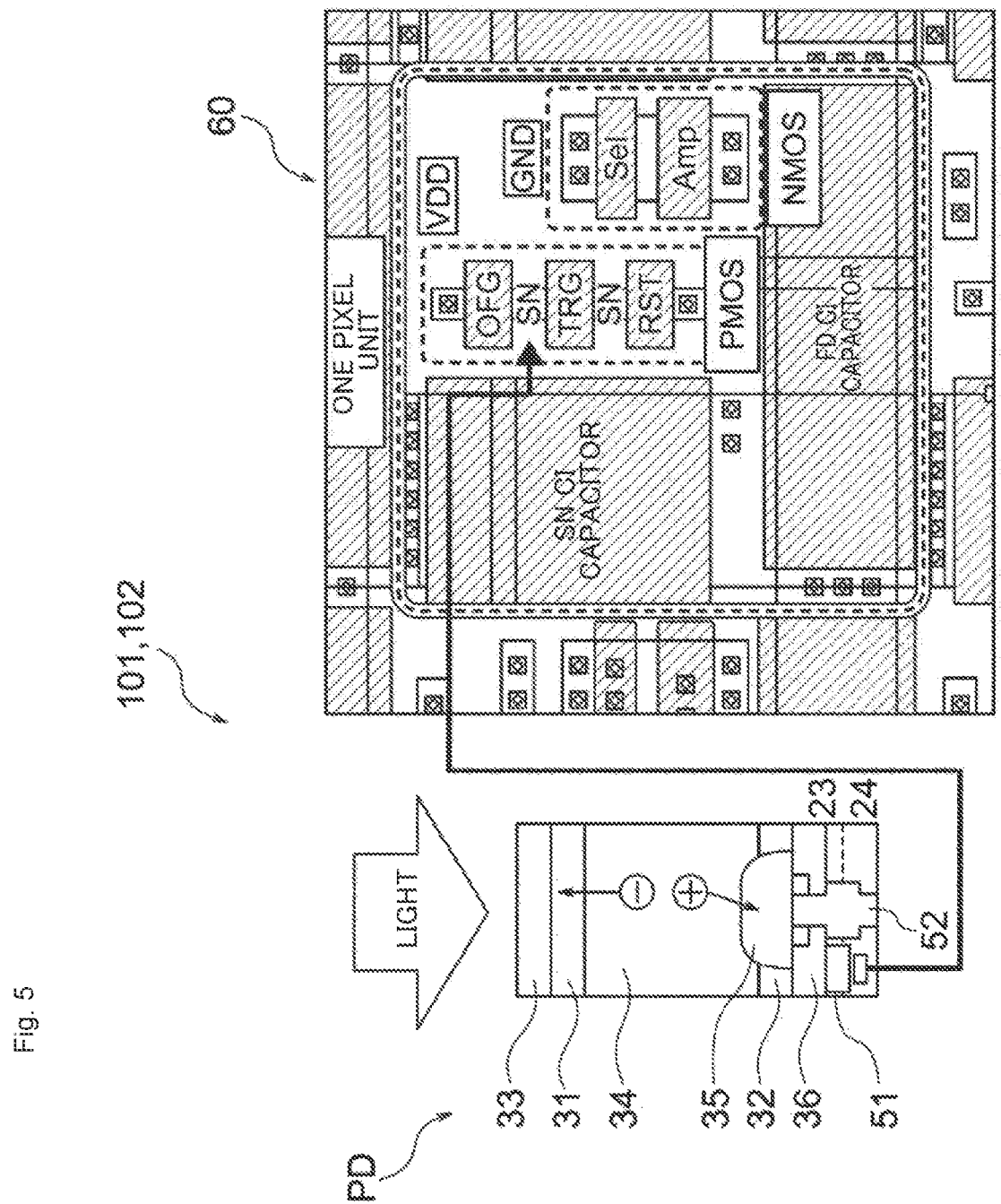
FIG. 5 is a diagram illustrating a schematic partial cross-sectional view of a photoelectric conversion element, and a view of the planar arrangement of each element.

FIG. 5 is a diagram illustrating a schematic partial cross-sectional view of the photoelectric conversion elements PD in the pixels 101 and 102, and a planar arrangement view of each element. As illustrated in FIG. 5, the photoelectric conversion element PD includes, for example, a support substrate 23, an insulating film 24, a first compound semiconductor layer 31, a second compound semiconductor layer 32, a reflective film 33, a photoelectric conversion layer 34, a second conductivity type region 35, a covering layer 36, a first electrode 51, and a second electrode 52. The second electrode 52 is electrically connected to the second conductivity type region 35. In this case, the first electrode 51 constituting each photoelectric conversion element PD is connected to a connection part SN provided in a driving board 60. As a result, for example, when infrared light is incident on the photoelectric conversion element PD from the first compound semiconductor layer 31 side, holes and electrons are generated as carriers in the photoelectric conversion layer 34. When a higher potential than the second electrode 52 is applied to the first electrode 51, a number of electrons corresponding to the number of positive holes absorbed by the second electrode 52 are supplied to the connection part SN from the first conductivity type region 31 through the first electrode 51. On the other hand, the holes exit to the exterior from the first second conductivity type region 35 and the second compound semiconductor layer 32 through the second electrode 52.

Figure 6:
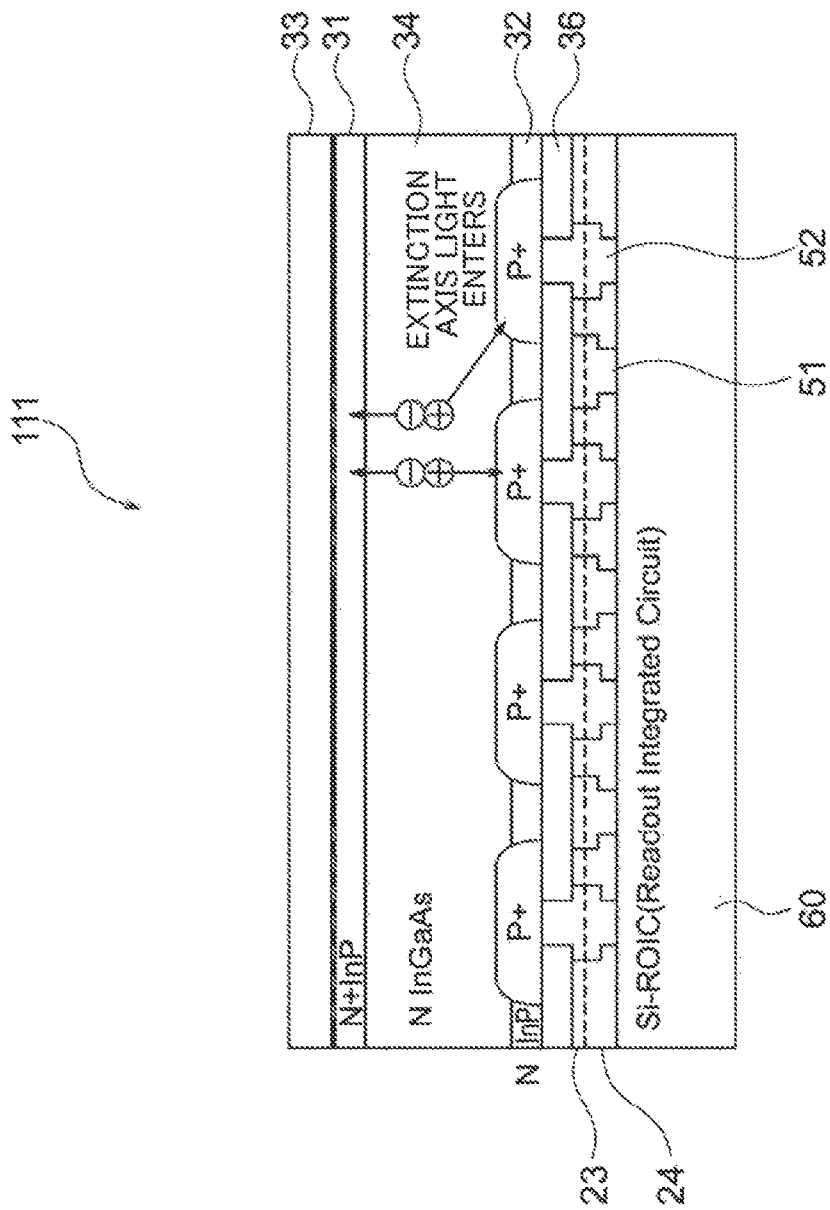
FIG. 6 is a schematic partial cross-sectional view of the photoelectric conversion element.

FIG. 6 is a diagram illustrating a schematic partial cross-sectional view of the photoelectric conversion elements PD in the pixels 101 and 102. As illustrated in FIG. 6, it is difficult to provide a partition between the pixels in the photoelectric conversion layer 34 formed from InGaAs. For this reason, for example, the holes generated by light incident on the photoelectric conversion layer corresponding to the pixel 101 are absorbed by the adjacent second electrode 52 as extinction axis light. In this manner, in the driving of a typical electric conversion element PD, the extinction axis light causes color mixing between pixels.

Figure 7:
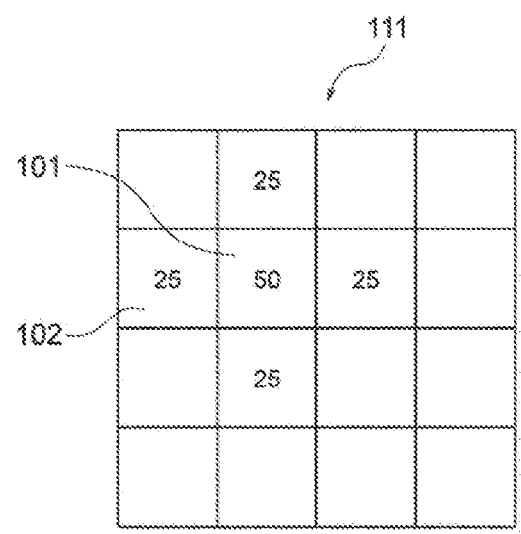
FIG. 7 is a diagram schematically illustrating the ratios of extinction axis light in pixels adjacent above, below, to the left, and to the right of a pixel.

FIG. 7 is a diagram schematically illustrating the ratios of extinction axis light in the pixels 102 adjacent above, below, to the left, and to the right of the pixel 101. As illustrated in FIG. 7, among the holes generated by light incident on the photoelectric conversion layer corresponding to the pixel 101, when holes are absorbed by the second electrode 52 corresponding to the pixel 101 at a ratio of 50, for example, the holes are absorbed by the adjacent pixel 102 as extinction axis light at a ratio of 25, for example. In this manner, in the driving of a typical electric conversion element PD, the extinction axis light causes color mixing between pixels, i.e., what is known as "crosstalk" between pixels. It is thought this such crosstalk becomes worse as sizes become smaller. Additionally, since there is no separating partition between the pixels, there is a risk that the read-out rows and adjacent rows will be affected by color mixing, which will worsen the linearity.

On the other hand, it has been found that only a few percent, e.g., 2 to 3 percent, is absorbed as extinction axis light by another pixel 101 adjacent to the pixel 101 in the diagonal direction. Accordingly, in the present embodiment, the color mixing between pixels is suppressed by drive control that shifts the image capturing timings of the first pixel group and the second pixel group.

Example of Driving in Global Shutter Method According to Present Embodiment

Figure 8:
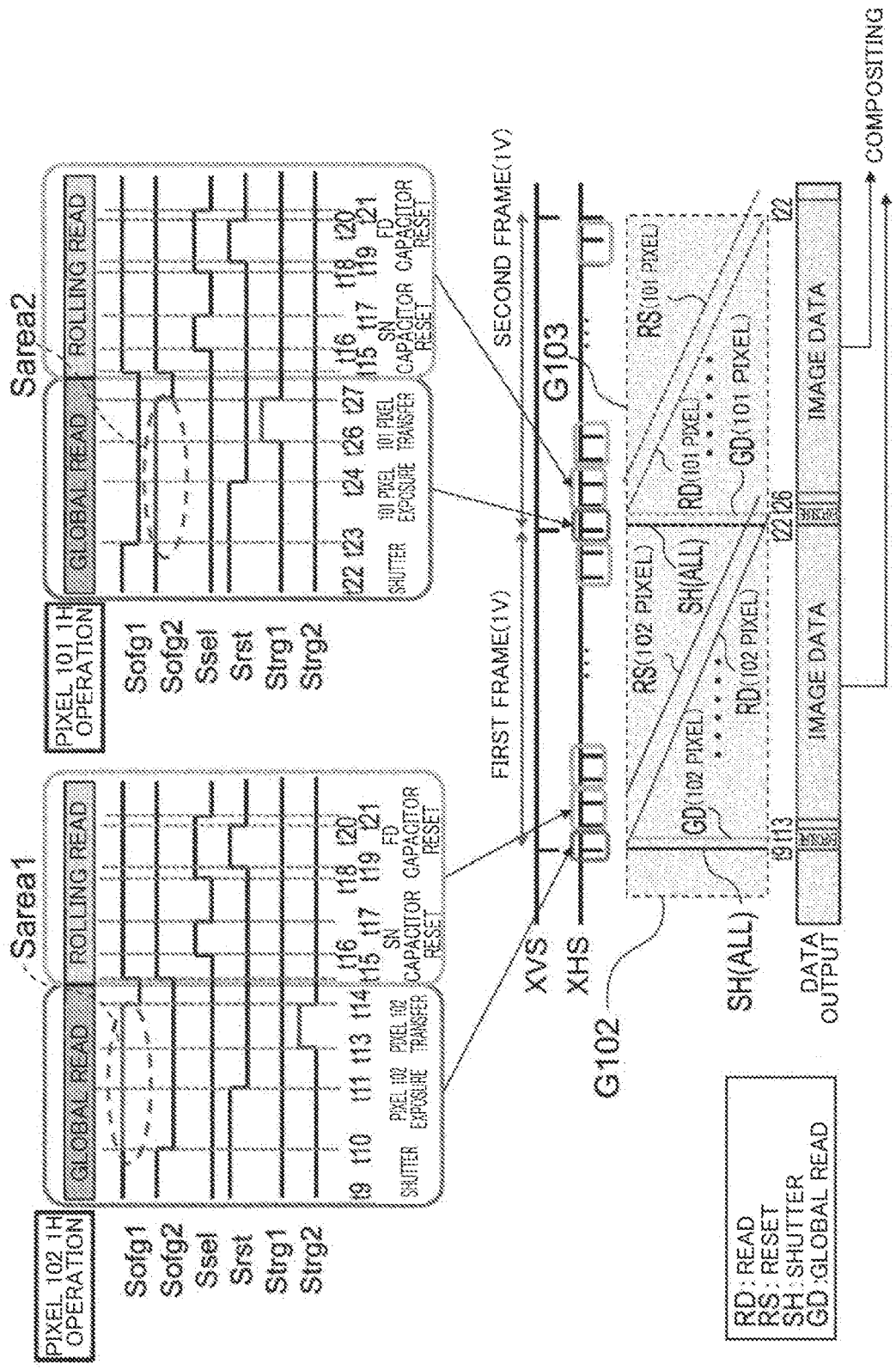
FIG. 8 is a diagram illustrating an example of driving in a global shutter method according to the first embodiment.

An example of driving in a global shutter method according to a first embodiment will now be described with reference to FIG. 8. FIG. 8 is a diagram illustrating an example of driving in a global shutter method according to the first embodiment.

The example of driving in the global shutter method according to the first embodiment is an example in which image capturing for the second pixel group in a first frame and data readout of the pixel group (101, 102) is performed, and image capturing for the first pixel group in a second frame and data readout of the pixel group (101, 102) is performed. In this case, in the first frame, the FD CI capacitors in the first pixel group are kept in a reset state in which charge accumulation is suppressed. Meanwhile, in the second frame, the FD CI capacitors in the second pixel group are kept in a reset state in which charge accumulation is suppressed. Accordingly, in the first frame, signals in the reset state are read out from the first pixel group, and signals including the image signals are read out from the second pixel group. On the other hand, in the second frame, signals in the reset state are read out from the second pixel group, and signals including the image signals are read out from the first pixel group.

The lower part of FIG. 8 indicates a vertical synchronization signal XVS and a horizontal synchronization signal XHS. The horizontal axis represents time, and the vertical axis represents the vertical synchronization signal XVS and the horizontal synchronization signal XHS. An image G102 is a diagram schematically illustrating the driving state of the pixels 102 in the pixel region 111. The vertical axis represents the row of the pixel region 111, and the horizontal axis represents time. An image G103 is a diagram schematically illustrating the driving state of the pixels 101 in the pixel region 111. The vertical axis represents the row of the pixel region 111, and the horizontal axis represents time. The bottom figure further indicates the exposure states and the data transfer times. The upper-left figure illustrates a timing chart for global reading for each pixel 102 and a timing chart of rolling reading for one row's worth of the pixels 101 and 102. The upper-right figure illustrates a timing chart for global reading for each pixel 101 and a timing chart of rolling reading for one row's worth of the pixels 101 and 102.

Image Capture and Readout of Second Pixel Group

At a timing t9 immediately before exposure at the beginning of a first frame period, the vertical drive circuit 112 puts the transistors OFG1 and OFG2 included in all the pixels 101 and 102 in the pixel region 111 into an on state (a conductive state) with the drive signals Sofg1 and Sofg2 in each row in the high state at the same time. At this time, the drive signals Strg1 and Strg2 are in a low state, and the transfer transistors TRG1 and TRG2 are in an off state (a non-conductive state). As a result, in the pixels 101 and 102, the charges accumulated in the SN CI capacitors are absorbed into the power supply line of the power supply VDR, and the SN CI capacitors are reset. As indicated by the line SH (ALL) in the figure G102, the electronic shutter drops for all rows at the same time. Additionally, the drive signals Srst from the vertical drive circuit 112 enter a high state, and the transistors RST included in all the pixels 101 and 102 in the pixel region 111 enter an on state. As a result, in the pixels 101 and 102, the charges accumulated in the FD CI capacitors are absorbed into the power supply line of the power supply VDR, and the FD CI capacitors are reset.

Next, at a timing t10, the vertical drive circuit 112 puts the transistors OFG2 included in all the pixels 102 in the pixel region 111 into the off state, with the drive signals Sofg2 in each row in the low state at the same time. As a result, one frame's worth of exposure is started for the pixels 102 constituting the second pixel group.

On the other hand, the vertical drive circuit 112 keeps the drive signals Sofg1 in each row in the high state until a timing t14. In other words, as indicated by a signal region Sarea1, the electronic shutter of the pixels 101 constituting the first pixel group is kept down. During this time, the charges accumulated in the SN CI capacitors of the pixels 101 constituting the first pixel group are absorbed into the power supply line of the power supply VDR.

Next, at a timing t11, the vertical drive circuit 112 puts the transistors RST included in all the pixels 101 and 102 in the pixel region 111 into the off state, with the drive signals Srst in each row in the low state at the same time.

Next, at a timing t13, the vertical drive circuit 112 puts the transistors TRG2 included in all the pixels 102 in the pixel region 111 into the on state, with the drive signals Strg2 in each row in the high state at the same time. As a result, the charges accumulated in the SN CI capacitors of the pixels 102 constituting the second pixel group are simultaneously distributed to the FD CI capacitors. As indicated by a line GD (102 pixel) in the figure G102, the charge distributions for the pixels 102 in all rows are performed at the same time. However, the drive signal Strg1 in each row is kept in the low state during the first frame. As a result, the FD CI capacitors of all the pixels 102 are kept in the reset state.

Then, at a timing t14, the vertical drive circuit 112 puts the transistors TRG2 included in the pixels 102 into the off state, with the drive signals Strg2 in each row in the low state at the same time. This completes the driving in the global shutter method for the second pixel group. On the other hand, the drive signals Strg1 in each row are kept in the low state for the duration of the one-frame period, and thus the charges are not distributed to the FD CI capacitors of the pixels 101 in that one-frame period. In other words, the FD CI capacitors of the pixel 101 are always kept in the reset state during the one-frame period.

Rolling Reading for First Frame

Next, rolling reading is started at a timing t15. The vertical drive circuit 112 puts the transistors OFG1 and OFG2 included in all the pixels 101 and 102 in the pixel region 111 into an on state (a conductive state) with the drive signals Sofg1 and Sofg2 in each row in the high state at the same time. The transistors OFG1 and OFG2 are always kept in the on state (the conductive state) during this one-frame period. As a result, the SN CI capacitors of all the pixels 101 and 102 are reset.

Next, at a timing t16, the drive signals Ssel are put into the high state and the path selection transistors Sel are put into the on state. As a result, signals in which the charges accumulated in the FD CI capacitors are converted into voltages are read out, amplified by the amplifying transistors Amp, and output to a vertical signal line VSL2 through the path selection transistors Sel. In this case, the signal corresponding to the FD CI capacitor of the pixel 102 includes an offset-based noise signal and the pixel signal. For this reason, the readout of this signal is referred to as a D-phase (Data Phase) readout, and the period during which the D-phase readout is performed is referred to as a D-phase period. This state is indicated by a line RD (102 pixel) in the figure G102. As indicated by the line RD (102 pixel), the charges accumulated in the FD CI capacitors in all rows are read out in time series for each row.

Meanwhile, since the FD CI capacitors corresponding to the pixels 101 are kept in the reset state, the pixel signal is not included, and only the offset-based noise signal is present. In other words, the offset-based noise signals are output in the D-phase readout of the FD CI capacitors corresponding to the pixels 101.

Next, at a timing t17, the drive signals Ssel are put into the low state and the path selection transistors Sel are put into the off state. Then, at a timing t18, the drive signals Ssel are put into the high state and the path selection transistors Sel are put into the on state. Then, at a timing t19, the drive signals Srst are put into the high state, the reset transistors Rst are put into the on state, and the FD CI capacitors are reset. The reset transistors RSt are kept in the on state until a timing t20, and the signals produced by the reset level voltages of the FD CI capacitors are output. The signals include offset-based noise, and the readout of the signal from the FD CI capacitor is referred to as a P-phase (Pre-Charge) readout, with the period during which the P-phase readout is performed being referred to as a P-phase period. This state is indicated by a line RS (102 pixel) in the figure G102. As indicated by the line RS (102 pixel), the reset levels of the FD CI capacitors in all rows are read out in time series for each row. The readout processing of the second pixels 102 in all rows in the pixel region 111 is then completed within one frame period.

Image Capture and Readout of First Pixel Group

The image of the first pixel group is captured and read out in a second frame period following the first frame period. The image capturing and readout of the first pixel group is similar to the image capturing and readout of the second pixel group. In other words, at a timing t22 immediately before exposure at the beginning of the second frame period, the vertical drive circuit 112 puts the transistors OFG1 and OFG2 included in all the pixels 101 and 102 in the pixel region 111 into an on state (a conductive state) with the drive signals Sofg1 and Sofg2 in each row in the high state at the same time. At this time, the drive signals Strg1 and Strg2 are in a low state, and the transfer transistors TRG1 and TRG2 are in an off state (a non-conductive state). As a result, in the pixels 101 and 102, the charges accumulated in the SN CI capacitors are absorbed into the power supply line of the power supply VDR, and the SN CI capacitors are reset. As indicated by the line SH (ALL) in the figure G103, the electronic shutter drops for all rows at the same time.

Additionally, the drive signals Srst from the vertical drive circuit 112 enter a high state, and the transistors RST included in all the pixels 101 and 102 in the pixel region 111 enter an on state. As a result, in the pixels 101 and 102, the charges accumulated in the FD CI capacitors are absorbed into the power supply line of the power supply VDR, and the FD CI capacitors are reset.

Next, at a timing t23, the vertical drive circuit 112 puts the transistors OFG1 included in all the pixels 101 in the pixel region 111 into the off state, with the drive signals Sofg1 in each row in the low state at the same time. As a result, one frame's worth of exposure is started for the pixels 101 constituting the first pixel group.

On the other hand, the vertical drive circuit 112 keeps the drive signals Sofg2 in each row in the high state until a timing t27. In other words, as indicated by a signal region Sarea2, the electronic shutter of the pixels 102 constituting the second pixel group is kept down. During this time, the charges accumulated in the SN CI capacitors of the pixels 102 constituting the second pixel group are absorbed into the power supply line of the power supply VDR.

Next, at a timing t26, the vertical drive circuit 112 puts the transistors TRG1 included in all the pixels 101 in the pixel region 111 into the on state, with the drive signals Strg1 in each row in the high state at the same time. As a result, the charges accumulated in the SN CI capacitors of the pixels 101 constituting the first pixel group are simultaneously distributed to the FD CI capacitors. As indicated by a line GD (103 pixel) in the figure G103, the charge distributions for the pixels 103 in all rows are performed at the same time. Then, at a timing t27, the vertical drive circuit 112 puts the transistors TRG1 included in the pixels 101 into the off state, with the drive signals Strg1 in each row in the low state at the same time. This completes the driving in the global shutter method for the first pixel group. On the other hand, the drive signals Strg2 in each row are kept in the low state for the duration of the second frame period, and thus the charges are not distributed to the FD CI capacitors of the pixels 102 in that 22nd frame period. In other words, the FD CI capacitors of the pixel 101 are always kept in the reset state during the two-frame period.

Rolling Reading for Second Frame

The rolling reading for the second frame performed through driving equivalent to that in the rolling reading for the first frame. In other words, first, rolling reading for the second frame is started at the timing t15. The vertical drive circuit 112 puts the transistors OFG1 and OFG2 included in all the pixels 101 and 102 in the pixel region 111 into an on state (a conductive state) with the drive signals Sofg1 and Sofg2 in each row in the high state at the same time. The transistors OFG1 and OFG2 are always kept in the on state (the conductive state) during this one-frame period. As a result, the SN CI capacitors of all the pixels 101 and 102 are reset.

Next, at a timing t16, the drive signals Ssel are put into the high state and the path selection transistors Sel are put into the on state. As a result, signals in which the charges accumulated in the FD CI capacitors are converted into voltages are read out, amplified by the amplifying transistors Amp, and output to a vertical signal line VSL2 through the path selection transistors Sel. In this case, the signal corresponding to the FD CI capacitor of the pixel 101 includes an offset-based noise signal and the pixel signal. This state is indicated by a line RD (101 pixel) in the figure G103. As indicated by the line RD (101 pixel), the charges accumulated in the FD CI capacitors in all rows are read out in time series for each row.

Meanwhile, since the FD CI capacitors corresponding to the pixels 102 are kept in the reset state, the pixel signal is not included, and only the offset-based noise signal is present. In other words, the offset-based noise signals are output in the D-phase readout of the FD CI capacitors corresponding to the pixels 102.

Next, at a timing t17, the drive signals Ssel are put into the low state and the path selection transistors Sel are put into the off state. Then, at a timing t18, the drive signals Ssel are put into the high state and the path selection transistors Sel are put into the on state. Then, at a timing t19, the drive signals Srst are put into the high state, the reset transistors Rst are put into the on state, and the FD CI capacitors are reset. The reset transistors RSt are kept in the on state until a timing t20, and the signals produced by the reset level voltages of the FD CI capacitors are output. As indicated by the line RS (101 pixel), the reset levels of the FD CI capacitors in all rows are read out in time series for each row. The readout processing of the second pixels 101 in all rows in the pixel region 111 is then completed within one frame period.

Figure 9:
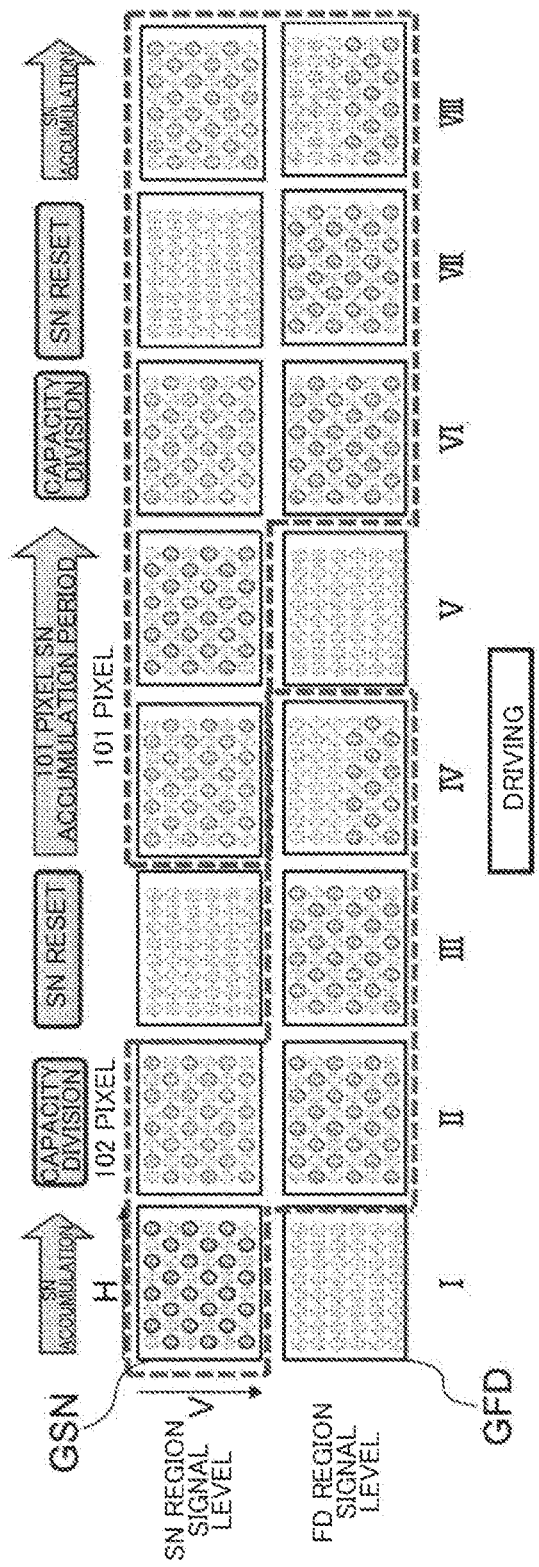
FIG. 9 is a diagram schematically illustrating a state change between a SN CI capacitor and a FD CI capacitor.

FIG. 9 is a diagram schematically illustrating a state change between the SN CI capacitor and the FD CI capacitor in the driving method illustrated in FIG. 8. A state change between the N CI capacitor and the FD CI capacitor will be described using FIG. 9, with reference to FIG. 8. An image GSN is a diagram illustrating the SN CI capacitor of each pixel in the pixel region 111 in a two-dimensional matrix. On the other hand, an image GFD is a diagram illustrating the FD CI capacitor of each pixel in the pixel region 111 in a two-dimensional matrix.

A phase I (the latter half of SN accumulation in the pixels 102) is, for example, timings t11 to t13, and the image GSN of the phase I indicates a state in which charges are accumulating in the SN CI capacitors corresponding to the pixels 102. Meanwhile, the FD CI capacitors are in a reset state, and the signal charges are not accumulated therein.

A phase II (capacitor distribution) is, for example, timings t13 to t14, and the image GSN of the phase II indicates a state in which charges of the SN CI capacitors corresponding to the pixels 102 are distributed to the FD CI capacitors. Meanwhile, the charges of the SN CI capacitors corresponding to the pixels 102 are distributed to the FD CI capacitors, indicating an accumulated state.

A phase III (SN reset) is, for example, timing t15, and the image GSN of the phase III indicates a state in which charges of the SN CI capacitors corresponding to all pixels are reset. Meanwhile, the charges of the SN CI capacitors corresponding to the pixels 102 are distributed to the FD CI capacitors, indicating an accumulated state.

A phase IV (the first half of SN accumulation in the pixels 101) is, for example, a period from timing 23 to the end of the rolling reading for the first frame, and the image GSN of the phase IV indicates a state in which charges are accumulated in the SN CI capacitors corresponding to the pixels 101. Meanwhile, a state in which charges of the FD CI capacitors corresponding to the pixels 101 and 102 of the FD CI capacitors undergo a rolling read is indicated. An image signal including an offset-based noise signal is generated from the FD CI capacitor charges of all the pixels 102. Meanwhile, during the entire period from the phases I to IV, the FD CI capacitors of all the pixels 101 are kept in the reset state, and thus an offset-based noise signal is generated from the FD CI capacitor charges of the pixels 101.

A phase V (the latter half of SN accumulation in the pixels 101) is, for example, timings t24 to t26, and the image GSN of the phase V indicates a state in which charges are accumulating in the SN CI capacitors corresponding to the pixels 102. Meanwhile, the FD CI capacitors are in a reset state, and the signal charges are not accumulated therein.

A phase VI (capacitor distribution) is, for example, timings t26 to t27, and the image GSN of the phase VI indicates a state in which charges of the SN CI capacitors corresponding to the pixels 101 are distributed to the FD CI capacitors. Meanwhile, the charges of the SN CI capacitors corresponding to the pixels 101 are distributed to the FD CI capacitors, indicating an accumulated state.

A phase VII (SN reset) is, for example, timing t15 of the second frame, and the image GSN of the phase VII indicates a state in which charges of the SN CI capacitors corresponding to all pixels are reset. Meanwhile, the charges of the SN CI capacitors corresponding to the pixels 101 are distributed to the FD CI capacitors, indicating an accumulated state.

A phase VIII (the first half of SN accumulation in the pixels 102) is, for example, a period from timing t10 to the end of the rolling reading for the second frame, and the image GSN of the phase VIII indicates a state in which charges are accumulated in the SN CI capacitors corresponding to the pixels 102. Meanwhile, a state in which charges of the SN CI capacitors corresponding to the pixels 101 and 102 of the FD CI capacitors undergo a rolling read is indicated. An image signal including an offset-based noise signal is generated from the FD CI capacitor charges of all the pixels 101. Meanwhile, during the entire period from the phases I to IV, the FD CI capacitors of all the pixels 102 are kept in the reset state, and thus an offset-based noise signal is generated from the FD CI capacitor charges of the pixels 101.

In this manner, during the period in which the charge accumulation of the SN CI capacitors in the pixels 102 is carried out (phase I and phase VIII), the SN CI capacitors in the pixels 101 are kept in a reset state, and the color mixing from the pixels 102 to the pixels 101 is suppressed. Likewise, during the period in which the charge accumulation of the SN CI capacitors in the pixels 101 is carried out (phase IV and phase V), the SN CI capacitors in the pixels 102 are kept in a reset state, and the color mixing from the pixels 101 to the pixels 102 is suppressed. On the other hand, the image capturing and readout of the second pixel group and the image capturing and readout of the first pixel group overlap with the rolling reading for the second pixel group and image capturing of the first pixel group. Likewise, the rolling reading for the first pixel group and the image capturing of the second pixel group overlap. This makes it possible to improve the efficiency of image capturing while suppressing color mixing.

Two Modes of Signal Processing

The column signal processing circuit 113 according to the present embodiment has two signal processing modes for signal processing. The first mode is a method of correcting a signal read out in the D-phase period using a signal read out in the P-phase period. In the first mode, there is no time difference between the D-phase period and the P-phase period, so the time correlation of the offset is high, and the correction accuracy is high.

On the other hand, in the signal readout in the P-phase period, the reset transistors RST are on, but in the signal readout in the D-phase period, the reset transistors RST are off, and the signal generation states are therefore different.

For example, it is thought that bias potential caused by parasitic capacitance of the reset transistors RST may affect the potential of the FD CI capacitors between when the reset transistors RST are on and off.

Accordingly, in the second mode, the offset signal of the pixels 101 in the first pixel group read out in the D-phase period (t16 to t17) during image capturing of the pixels 102 in the second pixel group (the first frame) is used to correct the offset signal of the image signal read out in the D-phase period (t16 to t17) (the second frame) during image capturing of the pixels 101 in the first pixel group. Likewise, the offset signal of the pixels 102 in the second pixel group read out in the D-phase period (t16 to t17) (the second frame) during image capturing of the pixels 101 in the first pixel group is used to correct the offset signal of the image signal read out in the D-phase period (t16 to t17) during image capturing of the pixels 102 in the second pixel group (the first frame). The reset transistors RST are both off, the signal generation states are equivalent, and for example, the influence of the parasitic capacitance of the reset transistors RST is suppressed, and the correction accuracy is even higher.

Figure 10:
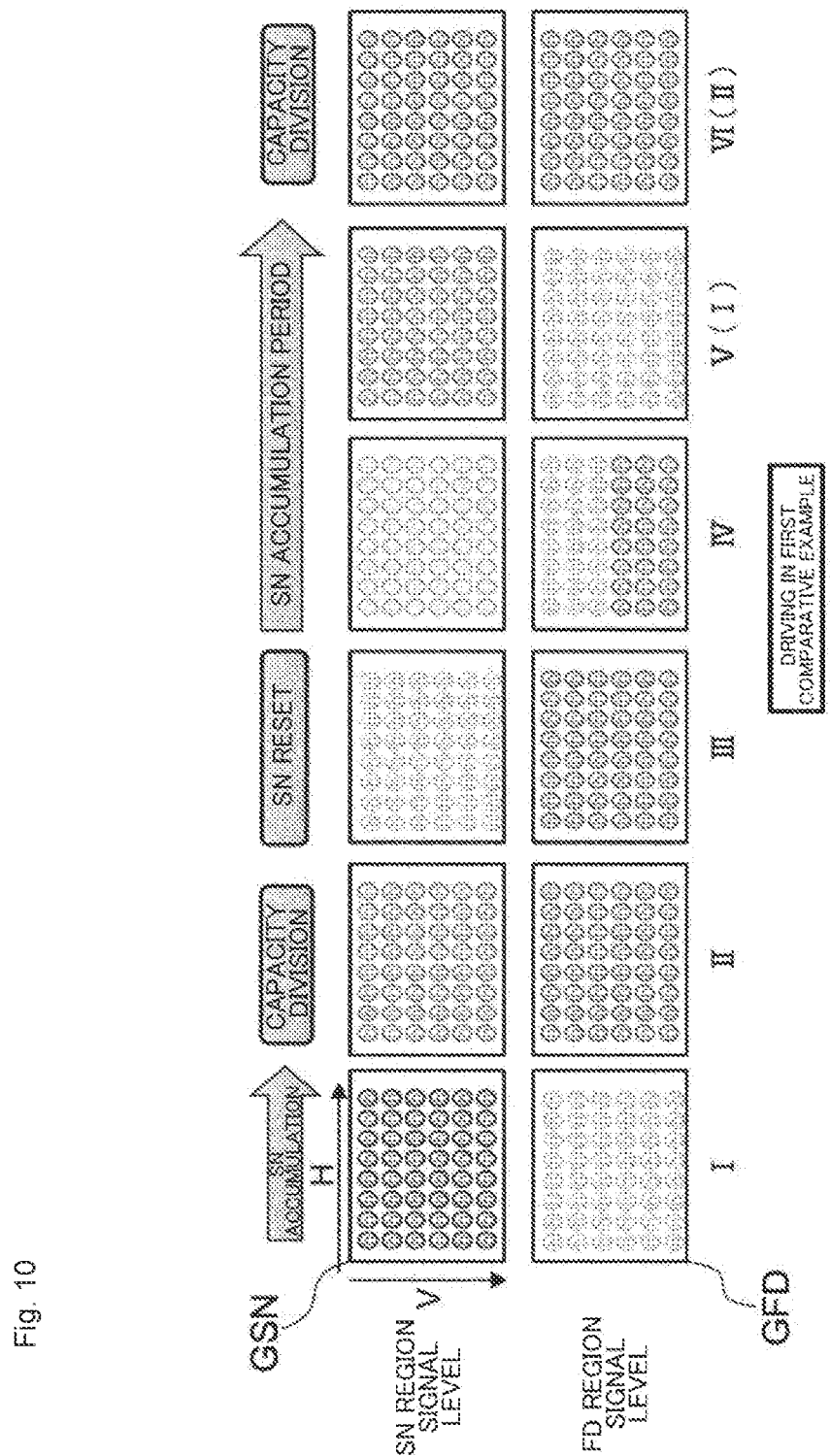
FIG. 10 is a diagram illustrating an example of driving according to a first comparative example.

FIG. 10 is a diagram illustrating an example of driving according to a first comparative example. In the first comparative example, the SN CI capacitors in all the pixels 101 and 102 accumulate at the same time, and rolling readout is performed on all the pixels 101 and 102. In other words, the image GSN of phase I (the latter half of SN accumulation in the pixels 101 and 102) indicates a state in which charges are accumulated in the SN CI capacitors corresponding to all the pixels 101 and 102. Meanwhile, the FD CI capacitors are in a reset state, and the signal charges are not accumulated therein.

The image GSN of phase II (capacitor distribution) indicates a state in which charges of the SN CI capacitors corresponding to all pixels 101 and 102 are distributed to the FD CI capacitors. Meanwhile, the charges of the SN CI capacitors corresponding to all the pixels 101 and 102 are distributed to the FD CI capacitors, indicating an accumulated state.

The image GSN of phase III (SN reset) indicates a state in which charges of the SN CI capacitors corresponding to all pixels are reset. Meanwhile, the charges of the SN CI capacitors corresponding to the pixels 102 are distributed to the FD CI capacitors, indicating an accumulated state.

The image GSN of phase IV (the first half of SN accumulation in the pixels 101 and 102) indicates a state in which charges are accumulated in the SN CI capacitors corresponding to all the pixels 101 and 102. Meanwhile, a state in which charges of the SN CI capacitors corresponding to the pixels 102 of the FD CI capacitors undergo a rolling read is indicated. The processing from phase I is repeated thereafter.

In the first comparative example, the image capturing and readout of all pixels ends in the I frame, but the color mixing described in FIGS. 6 and 7 occurs. In the driving of in the first comparative example, the signal readout in the P-phase period turns on the reset transistors RST, and the signal readout in the D-phase period cannot avoid turning off the reset transistors RST, which means the signal generation states are different. For this reason, there is a risk that the correction accuracy will drop in the same manner as in the first mode described above.

Figure 11:
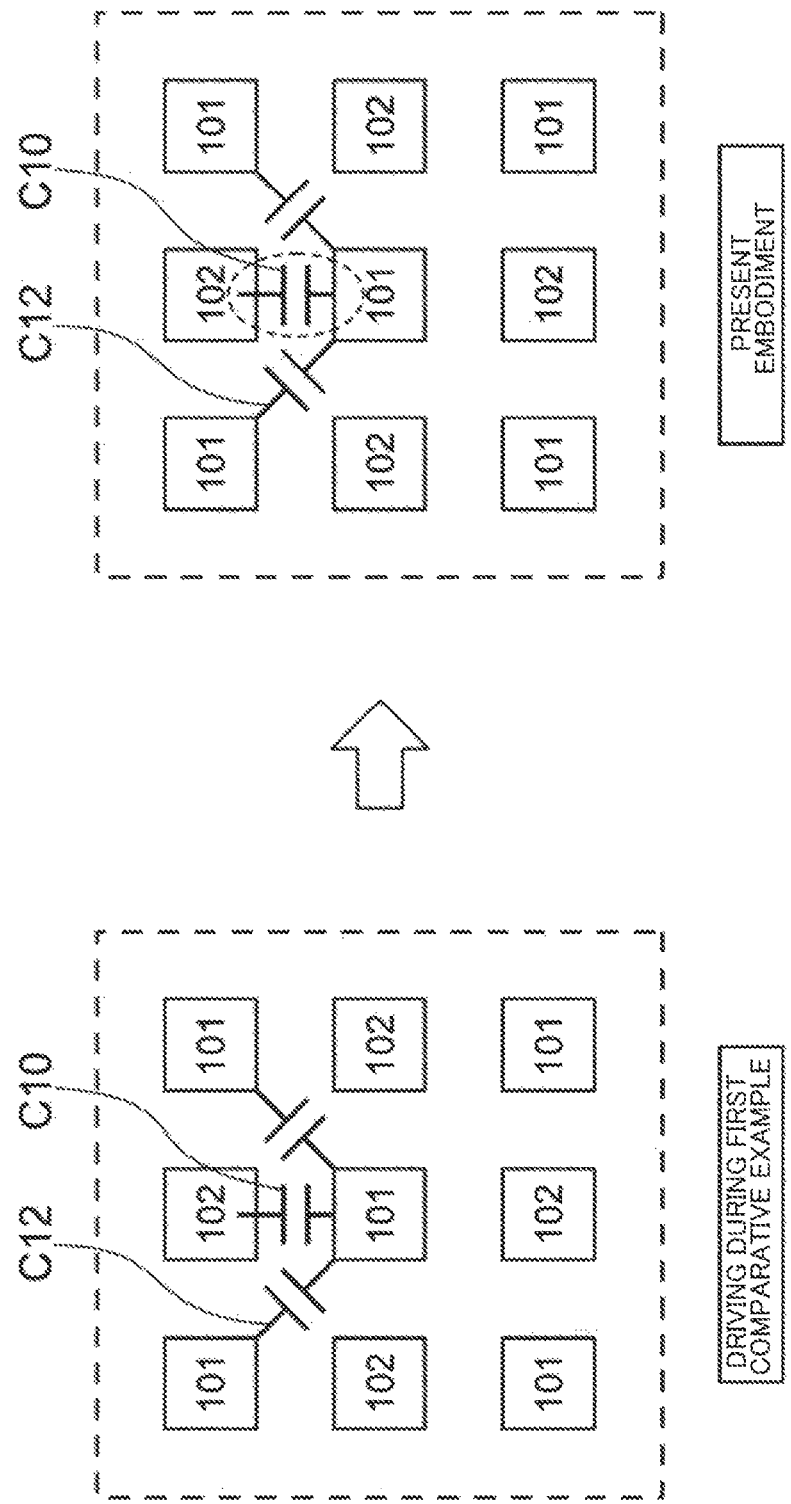
FIG. 11 is a diagram schematically illustrating parasitic capacitance between pixels in the first comparative example and parasitic capacitance between pixels in the present embodiment.

FIG. 11 is a diagram schematically illustrating parasitic capacitance between pixels in the first comparative example and parasitic capacitance between pixels in the present embodiment. When charges are accumulated in the SN CI capacitors, the parasitic capacitance between the SN nodes, e.g., a parasitic capacitance C10 with the upper, lower, left, and right pixels is, for example, 0.3 (a.u.), and the parasitic capacitance C12 between pixels in the diagonal direction is, for example, 0.03 (a.u.), for a difference of about ten times. Accordingly, in the example of driving in the first comparative example, the bias potential of the parasitic capacitance C10 in the upper, lower, left, and right directions is affected by the SN CI capacitors. On the other hand, with the driving method according to the present embodiment, the upper, lower, left, and right pixels are always in the reset state, and thus the influence of the parasitic capacitance C10 with the upper, lower, left, and right pixels is suppressed.

Figure 12:
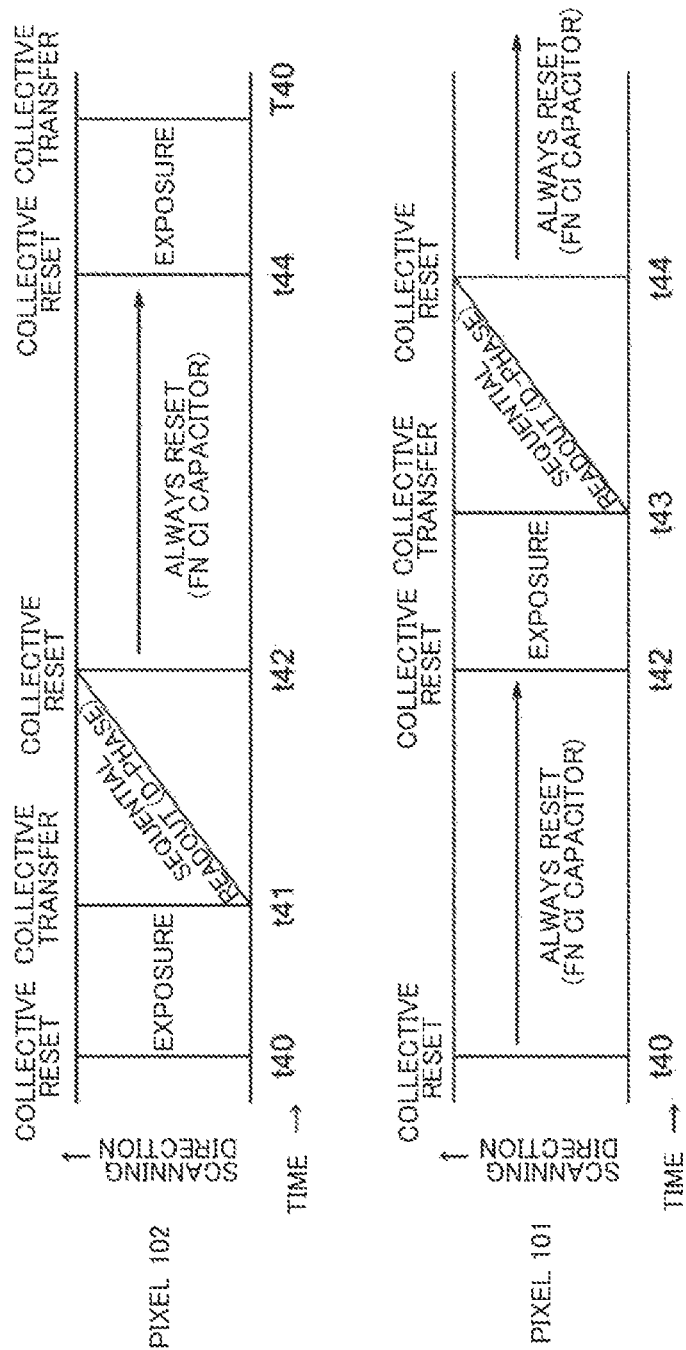
FIG. 12 is a diagram schematically illustrating a driving method in mode 2 according to an embodiment.

FIG. 12 is a diagram schematically illustrating a driving method in mode 2 according to the present embodiment. The driving state of the pixels 102, where the second pixel group is on the upper side, and the driving state of the pixels 101, where the first pixel group is on the lower side, are indicated. As illustrated in FIG. 12, all SN CI capacitors and all total FD CI capacitors are reset at t40, the SN CI capacitors and the FD CI capacitors of the pixels 101 are kept in a reset state, and the accumulation (exposure) in the SN CI capacitors of the pixels 102 is performed up until t41. The D-phase readout of the FD CI capacitors corresponding to all the pixels is then performed in the period from t41 to t42. As a result, pixel signals including offset signals are output from the pixels 102. Meanwhile, only the offset-based noise signals are output from the pixels 101.

All SN CI capacitors and all total FD CI capacitors are reset at t42, the SN CI capacitors and the FD CI capacitors of the pixels 102 are kept in a reset state, and the accumulation (exposure) in the SN CI capacitors of the pixels 101 is performed up until t43. The D-phase readout of the FD CI capacitors corresponding to all the pixels is then performed in the period from t43 to t44. As a result, pixel signals including offset signals are output from the pixels 101. Meanwhile, only the offset-based noise signals are output from the pixels 102.

The signal processing in mode 2 corrects the pixel signals corresponding to the FD CI capacitors of the pixels 102 read out in the period from t41 to t42 with the offset signals corresponding to the FD CI capacitors of the pixels 102 read out in the period from t43 to t44. Likewise, using the offset signals corresponding to the FD CI capacitors of the pixels 101 read out in the period from t41 to t42, the image signals corresponding to the FD CI capacitors of the pixels 101 read out in the period from t43 to t44 are corrected. As described above, in mode 2, the generation states of the pixel signals including noise signals and the noise signals are equivalent, and for example, the influence of the parasitic capacitance of the reset transistors RST is suppressed, which further increases the correction accuracy.

Figure 13:
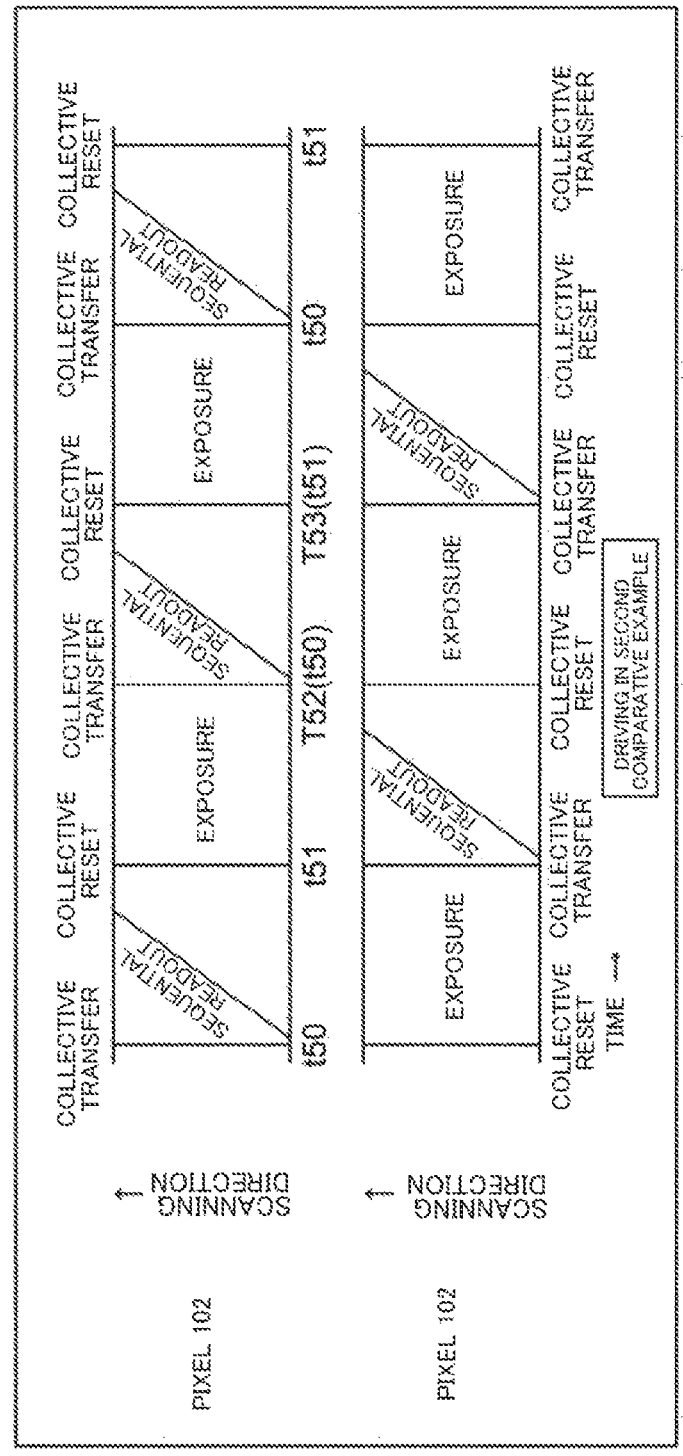
FIG. 13 is a diagram illustrating an example of driving according to a second comparative example.

FIG. 13 is a diagram illustrating an example of driving according to a second comparative example. The SN CI capacitors and all FD CI capacitors of the pixels 101 in the first pixel group are reset at t50, and the charge accumulation (exposure) in the SN CI capacitors of the pixels 101 in the first pixel group is performed up to t51. The charges of the SN CI capacitors of the pixels 101 are then transferred to the FD CI capacitors of the pixels 101 at t51, and the FD CI capacitors of the pixels 101 are read out. Such driving is repeated in the first pixel group.

On the other hand, in the second pixel group, the SN CI capacitors and all FD CI capacitors of the pixels 101 in the second pixel group are reset at t51, and the charge accumulation (exposure) in the SN CI capacitors of the pixels 101 in the first pixel group is performed up to t52. The charges of the SN CI capacitors of the pixels 101 are then transferred to the FD CI capacitors of the pixels 102 at t53, and the FD CI capacitors of the pixels 102 are read out. In this manner, in the example of driving in the second comparative example, the exposure and readout of the first pixel group and the second pixel group are performed in parallel and in an alternating manner. The second comparative example does not include driving for D-phase readout of the charges of the FD CI capacitors in the reset state. As such, only the signal processing in mode 1 according to the present embodiment can be performed, and there is thus a risk that the correction accuracy will drop as described above.

As described above, according to the present embodiment, the vertical drive circuit 112 keeps the accumulated charges in the FD CI capacitors of the second pixel group in a reset state during a first period (t41 to t42) of signal readout based on the accumulated charges of the FD CI capacitors in the pixel region 111. This makes it possible to read out the offset-based noise signal in the second pixel group during the D-phase period. This makes it possible to correct the signal read out from the second pixel group during the D-phase period using the noise signal read out in a D-phase period involving equivalent driving, and improves the correction accuracy. Additionally, by switching the pixel groups for image capturing between the first frame and the second frame, and setting one pixel group to a reset state during the image capture for the other pixel group and vice versa to create a time difference in the image capturing, crosstalk to adjacent pixels is suppressed, and a drop in the linearity with respect to light entering the pixels is also suppressed.

Second Embodiment

An electronic device 1 according to a second embodiment differs from the electronic device 1 according to the first embodiment in that the exposure period is different between the pixels 101 in the first pixel group and the pixels 102 in the second pixel group. Differences from the electronic device 1 according to the first embodiment will be described below.

Figure 14:
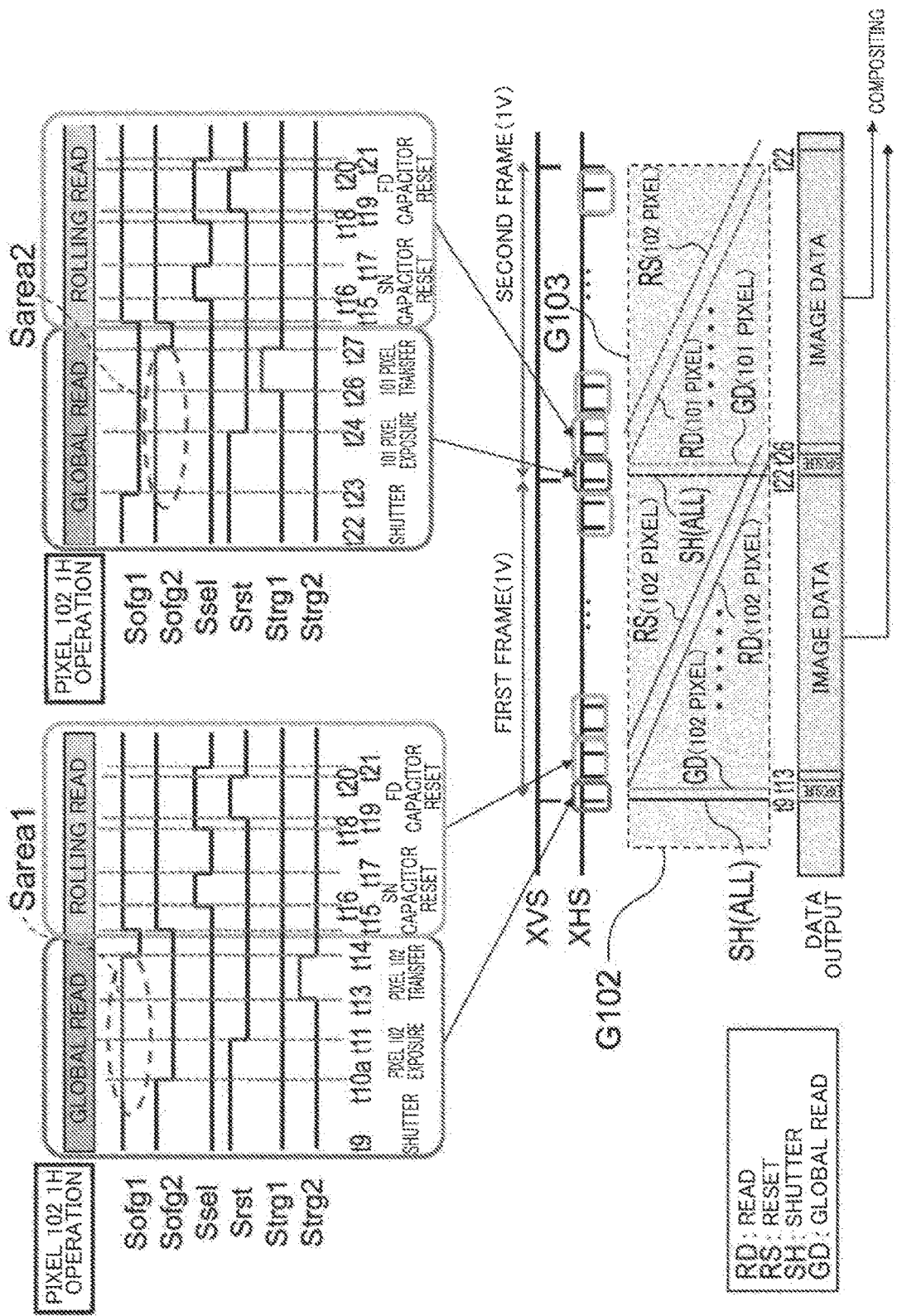
FIG. 14 is a diagram illustrating an example of driving in a global shutter method according to a second embodiment.

FIG. 14 is a diagram illustrating an example of driving in a global shutter method according to the second embodiment. In the example of driving in the global shutter method according to the second embodiment, the exposure time of the second pixel group, indicated in periods t10a to t13, is shorter than the exposure time of the first pixel group, indicated in periods t23 to t26. As a result, the pixels 102 in the second pixel group are sensitive to a higher level of luminance than the pixels 101 in the first pixel group. On the other hand, the pixels 101 in the first pixel group are sensitive to a lower level of luminance than the pixels 102 in the second pixel group.

Figure 15:
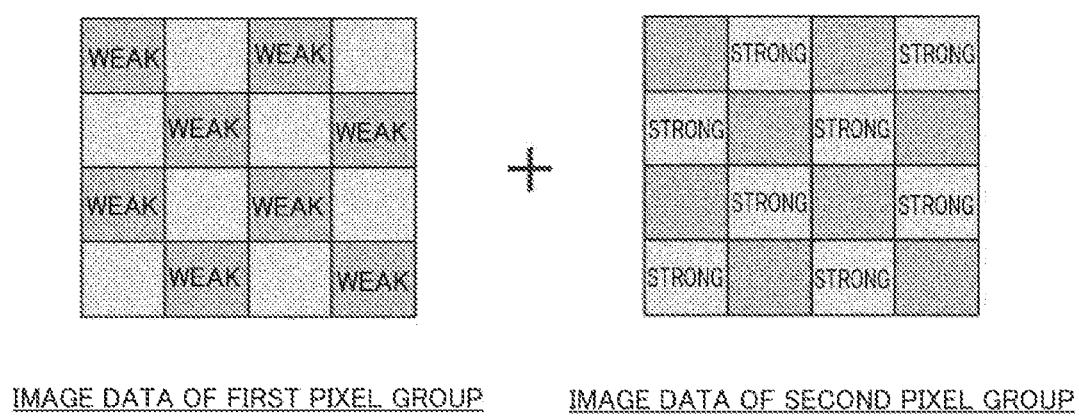
FIG. 15 is a diagram schematically illustrating image data of a first pixel group and image data of a second pixel group.

FIG. 15 is a diagram schematically illustrating image data of a first pixel group and image data of a second pixel group. The image processing unit 5 (see FIG. 1) performs interpolation processing on the pixel values in the image data of the first pixel group, and performs interpolation processing on the pixel values in the image data of the second pixel group. The interpolated image data of the first pixel group and the interpolated image data of the second pixel group are then added. This makes it possible to generate images with a high dynamic range, i.e., images with an expanded dynamic range.

Third Embodiment

An electronic device 1 according to a third embodiment differs from the electronic device 1 according to the first embodiment in that the photoelectric conversion element PD has a polarizing filter. Differences from the electronic device 1 according to the first embodiment will be described below.

Figure 16:
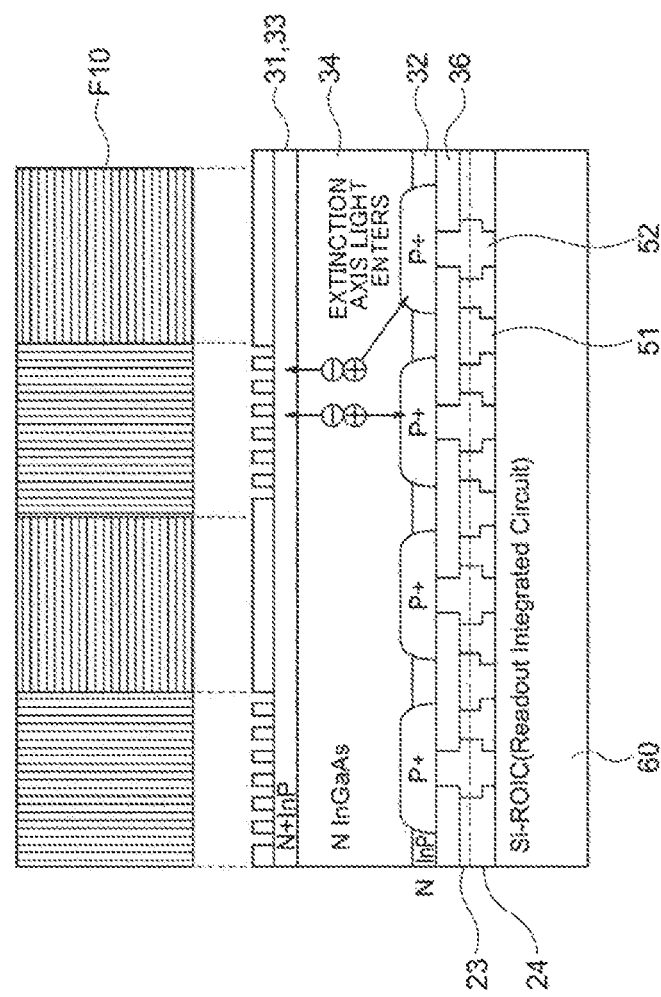
FIG. 16 is a schematic partial cross-sectional view of a photoelectric conversion element in a pixel according to a third embodiment.

FIG. 16 is a diagram illustrating a schematic partial cross-sectional view of the photoelectric conversion elements PD in the pixels 101 and 102 according to the third embodiment. As illustrated in FIG. 16, the pixels 101 and 102 according to the third embodiment have polarizing filters F10. As a result, the pixels 101 and 102 capture incident light through the polarizing filters F10.

Figure 17:
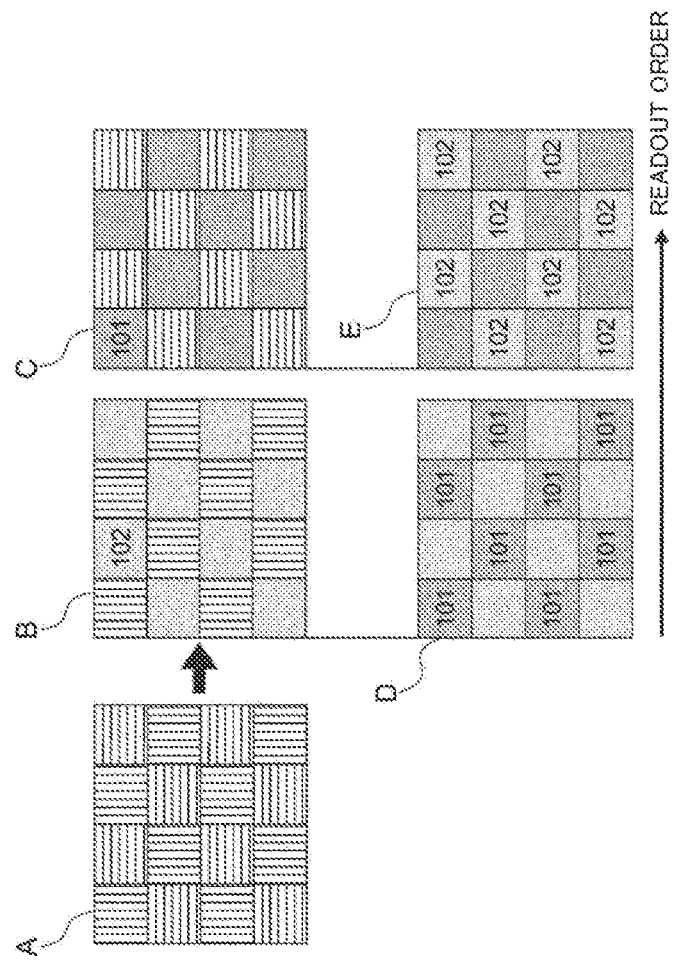
FIG. 17 is a diagram illustrating an arrangement relationship between a polarization filter and pixels.

FIG. 17 is a diagram illustrating an arrangement relationship between the polarizing filters F10 and the pixels 101 and 102. An image A is a plan view illustrating some of the polarizing filters F10, an image B is a plan view schematically illustrating that the pixels 102 are located below horizontal polarizing filters among the polarizing filters F10, and an image C is a plan view schematically illustrating that the pixels 101 are located below vertical polarizing filters of the polarizing filters F10. An image D is a diagram, corresponding to the image B, illustrating that image capturing and readout is performed for the pixels 101 under the vertical polarizing filters. An image E is a diagram, corresponding to the image C, illustrating that image capturing and readout is performed for the pixels 102 under the horizontal polarizing filters.

In this manner, image capturing and readout is performed for the pixels 101 in the first pixel group, and image capturing and readout is performed for the pixels 102 in the second pixel group. This makes it possible to suppress color mixing between the image signals produced by the horizontal polarizing filter and the image signals produced by the vertical polarizing filter. For this reason, Fourth Embodiment An electronic device 1 according to a fourth embodiment differs from the electronic device 1 according to the first embodiment in that the photoelectric conversion element PD has a light-blocking column member DTI. Differences from the electronic device 1 according to the first embodiment will be described below.

Figure 18:
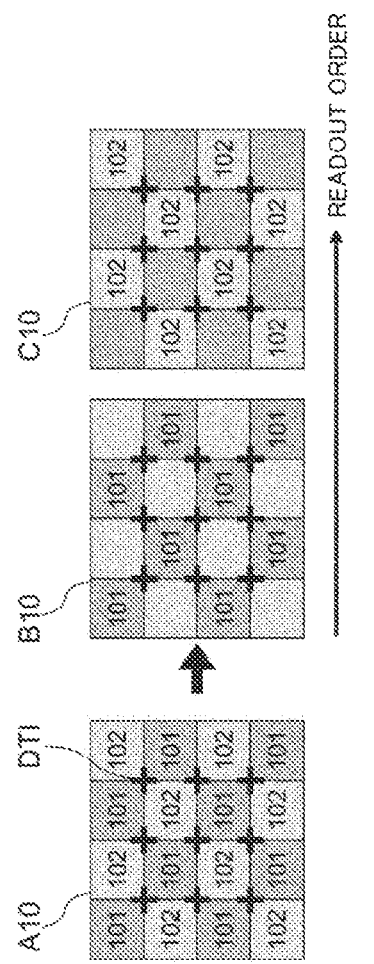
FIG. 18 is a plan view illustrating a part of a pixel region 11 according to a fourth embodiment.

FIG. 18 is a plan view illustrating a part of the pixel region 11 according to the fourth embodiment. A figure A10 is a diagram illustrating an example of the light-blocking column members DT being provided in the corners of the pixels 101 and 102. The light-blocking column member DT is formed from an oxide, aluminum, or the like, and is embedded in the first compound semiconductor layer 31, the reflective film 33, and the photoelectric conversion layer 34 (see FIG. 6). Figures B10 and C10 are diagrams illustrating that the image capturing and readout is performed for the pixels 102 after the image capturing and readout is performed for the pixels 101.

In this manner, by embedding the light-blocking column members DT, the movement of electrons and holes between the pixels 101 and the movement of electrons and holes between the pixels 102 is also suppressed. Extinction axis light between the pixels 101 and extinction axis light between the pixels 102 is therefore also suppressed. As a result, the color mixing between the pixels 101 and the color mixing between the pixels 102 is also suppressed, and color mixing in the pixel region 11 can therefore be further suppressed. As a result, color mixing can be suppressed even in near-infrared (NIR) and short-wave infrared (SWIR) polarized image capture by photoelectric conversion elements using InGaAs.

The present technique can also take on the following configurations.

(1)
An imaging element including:
a pixel region in which pixels, each including a photoelectric conversion unit and a first capacitor that accumulates a charge based on photoelectric conversion by the photoelectric conversion unit, are arranged in a two-dimensional matrix, the pixel region having a first pixel group constituted by pixels arranged adjacent to each other in a diagonal direction and a second pixel group constituted by pixels adjacent above, below, to the right, and to the left of the pixels in the first pixel group; and a drive unit that generates drive signals that drive the pixels in the pixel region, wherein in a first period of signal readout based on charges accumulated in the first capacitors in the pixel region, the drive unit maintains a reset state that suppresses charge accumulation in the first capacitors of the second pixel group.

(2)
The imaging element according to (1),
wherein in a second period different from the first period of signal readout based on charges accumulated in the first capacitors in the pixel region, the drive unit maintains a reset state that suppresses charge accumulation in the first capacitors of the first pixel group.

(3)
The imaging element according to (2), wherein a signal of the first pixel group read out in the first period is corrected using a signal of the first pixel group read out in the second period.

(4)
The imaging element according to (2),
wherein a signal of the second pixel group read out in the first period is corrected using a signal of the second pixel group read out in the second period.

(5)
The imaging element according to (4),
wherein the photoelectric conversion unit is a photoelectric conversion element using InGaAs.

(6)
The imaging element according to (5),
wherein in a first exposure period in which the pixels of the first pixel group are exposed, the drive unit maintains a reset state that suppresses charge accumulation in response to the exposure of the pixels in the second pixel group.

(7)
The imaging element according to (6),
wherein in a second exposure period that follows the first exposure period, the drive unit causes the pixels of the second pixel group to be exposed and maintains a reset state that suppresses charge accumulation in the pixels of the first pixel group.

(8)
The imaging element according to (7),
wherein the first exposure period and the second exposure period have different lengths.

(6)
The imaging element according to (1),
wherein the pixels of the first pixel group are exposed via a polarizing element that polarizes in a first direction, and the pixels in the second pixel group are exposed via a polarizing element that polarizes in a second direction different from the first direction.

(10)
The imaging element according to (1),
wherein a light-blocking column member is provided at a corner of at least one pixel in the pixel region.

(11)
The imaging element according to (7),
wherein each of the pixel includes at least:
the photoelectric conversion unit;
a second capacitor that accumulates a charge generated by the photoelectric conversion unit;
a transfer transistor that transfers the charge accumulated in the second capacitor to the first capacitor;
the first capacitor; and
an amplifying transistor that amplifies the first capacitor and outputs a signal at a level according to the charge.

(12)
The imaging element according to (11),
wherein the transfer transistor of each of the pixels of the first pixel group disposed in the same row of the pixel region is connected to the drive unit by a first control line, and the transfer transistor of each of the pixels in the second pixel group disposed in the same row of the pixel region is connected to the drive unit by a second control line different from the first control line.

(13)
The imaging element according to (12),
wherein the pixel further includes:
a second reset transistor that puts the second capacitor in a reset state; and
a first reset transistor that puts the first capacitor in a reset state.

(14)
The imaging element according to (13),
wherein the second reset transistor of each of the pixels of the first pixel group disposed in the same row of the pixel region is connected to the drive unit by a third control line, and the second reset transistor of each of the pixels in the second pixel group disposed in the same row of the pixel region is connected to the drive unit by a fourth control line different from the third control line.

(15)
The imaging element according to (13),
wherein the drive unit performs the signal readout in the first period while keeping the transfer transistors in the second pixel group in a non-conductive state and after putting the first capacitors into a reset state using the first reset transistors.

(16)
The imaging element according to (13),
wherein the drive unit performs the signal readout in the second period while keeping the transfer transistors in the first pixel group in a non-conductive state and after putting the first capacitors into a reset state using the first reset transistors.

(17)
The imaging element according to (13),
wherein in the first exposure period, the drive unit maintains a state in which the second reset transistors in the second pixel group are in a conductive state.

(18)
The imaging element according to (13),
wherein in the second exposure period, the drive unit maintains a state in which the second reset transistors in the first pixel group are in a conductive state.

(19)

An electronic device including the imaging element according to (1).

(20)

An electronic device including the imaging element according to (8), the electronic device further including:
an image processing unit that interpolates and composites first image data based on the first exposure period and second image data based on the second exposure period.

Aspects of the present disclosure are not limited to the aforementioned individual embodiments and include various modifications that those skilled in the art can achieve, and the effects of the present disclosure are also not limited to the details described above. In other words, various additions, modifications, and partial deletions can be made without departing from the conceptual ideas and spirit of the present disclosure that can be derived from the details defined in the claims and the equivalents thereof.

The invention claimed is:

1. An imaging element comprising:
a pixel region in which pixels, each including a photoelectric conversion unit and a first capacitor that accumulates a charge based on photoelectric conversion by the photoelectric conversion unit, are arranged in a two-dimensional matrix, the pixel region having a first pixel group constituted by pixels arranged adjacent to each other in a diagonal direction and a second pixel group constituted by pixels adjacent above, below, to the right, and to the left of the pixels in the first pixel group; and
a drive unit that generates drive signals that drive the pixels in the pixel region, wherein in a first period of signal readout based on charges accumulated in the first capacitors in the pixel region, the drive unit maintains a reset state that suppresses accumulated charge accumulation in the first capacitors of the second pixel group.

2. The imaging element according to claim 1,
wherein in a second period different from the first period of signal readout based on charges accumulated in the first capacitors in the pixel region, the drive unit maintains a reset state that suppresses accumulated charge accumulation in the first capacitors of the first pixel group.

3. The imaging element according to claim 2,
wherein a signal of the first pixel group read out in the first period is corrected using a signal of the first pixel group read out in the second period.

4. The imaging element according to claim 2,
wherein a signal of the second pixel group read out in the first period is corrected using a signal of the second pixel group read out in the second period.

5. The imaging element according to claim 4,
wherein the photoelectric conversion unit is a photoelectric conversion element using InGaAs.

6. The imaging element according to claim 5,
wherein in a first exposure period in which the pixels of the first pixel group are exposed, the drive unit maintains a reset state that suppresses charge accumulation with respect to the exposure of the pixels in the second pixel group.

7. The imaging element according to claim 6,
wherein in a second exposure period that follows the first exposure period, the drive unit causes the pixels of the second pixel group to be exposed and maintains a reset state that suppresses charge accumulation in the pixels of the first pixel group.

8. The imaging element according to claim 7,
wherein the first exposure period and the second exposure period have different lengths.

9. The imaging element according to claim 1,
wherein the pixels of the first pixel group are exposed via a polarizing element that polarizes in a first direction, and the pixels in the second pixel group are exposed via a polarizing element that polarizes in a second direction different from the first direction.

10. The imaging element according to claim 1,
wherein a light-blocking column member is provided at a corner of at least one pixel in the pixel region.

11. The imaging element according to claim 7,
wherein the pixel includes at least:
the photoelectric conversion unit;
a second capacitor that accumulates a charge generated by the photoelectric conversion unit;
a transfer transistor that transfers the charge accumulated in the second capacitor to the first capacitor;
the first capacitor; and
an amplifying transistor that amplifies the first capacitor and outputs a signal at a level according to the charge.

12. The imaging element according to claim 11,
wherein the transfer transistor of the pixels of the first pixel group disposed in the same row of the pixel region is connected to the drive unit by a first control line, and the transfer transistor of the pixels in the second pixel group disposed in the same row of the pixel region is connected to the drive unit by a second control line different from the first control line.

13. The imaging element according to claim 12, wherein the pixel further includes:
a second reset transistor that puts the second capacitor in an initial state; and
a first reset transistor that puts the first capacitor in an initial state.

14. The imaging element according to claim 13,
wherein the second reset transistor of the pixels of the first pixel group disposed in the same row of the pixel region is connected to the drive unit by a third control line, and the second reset transistor of the pixels in the second pixel group disposed in the same row of the pixel region is connected to the drive unit by a fourth control line different from the third control line.

15. The imaging element according to claim 13,
wherein the drive unit performs the signal readout in the first period while keeping the transfer transistors in the second pixel group in a non-conductive state and after putting the first capacitors into a reset state using the first reset transistors.

16. The imaging element according to claim 13,
wherein the drive unit performs the signal readout in the second period while keeping the transfer transistors in the first pixel group in a non-conductive state and after putting the first capacitors into a reset state using the first reset transistors.

17. The imaging element according to claim 13,
wherein in the first exposure period, the drive unit maintains a state in which the second reset transistors in the second pixel group are in a conductive state.

18. The imaging element according to claim 13,
wherein in the second exposure period, the drive unit maintains a state in which the second reset transistors in the first pixel group are in a conductive state.

19. An electronic device comprising the imaging element according to claim 1.

20. An electronic device comprising the imaging element according to claim 8, the electronic device further comprising:
   an image processing unit that interpolates and composites first image data based on the first exposure period and second image data based on the second exposure period.

* * * * *